US007941030B2

(12) United States Patent
Fuchigami et al.

(10) Patent No.: US 7,941,030 B2
(45) Date of Patent: May 10, 2011

(54) AUDIO/VIDEO RECORDING APPARATUS, RECORDING METHOD, PLAYBACK APPARATUS, PLAYBACK METHOD, PLAYBACK PROGRAM, AND RECORDING PROGRAM

(75) Inventors: Norihiko Fuchigami, Kamakura (JP); Seiji Higurashi, Fuchu (JP)

(73) Assignee: Victor Company of Japan, Limited, Yokohama, Kanagawa-ken (JP)

( * ) Notice: Subject to any disclaimer, the term of this patent is extended or adjusted under 35 U.S.C. 154(b) by 1489 days.

(21) Appl. No.: 10/551,766

(22) PCT Filed: Apr. 2, 2004

(86) PCT No.: PCT/JP2004/004857

§ 371 (c)(1), (2), (4) Date: Jan. 11, 2006

(87) PCT Pub. No.: WO2004/091204

PCT Pub. Date: Oct. 21, 2004

(65) Prior Publication Data

US 2006/0140575 A1 Jun. 29, 2006

(30) Foreign Application Priority Data

Apr. 4, 2003 (JP) ............................... P2003-101236
Apr. 4, 2003 (JP) ............................... P2003-101237
Apr. 4, 2003 (JP) ............................... P2003-101238
Dec. 16, 2003 (JP) ............................... P2003-417551

(51) Int. Cl.
*H04N 9/80* (2006.01)
*H04N 5/93* (2006.01)
*G11B 27/00* (2006.01)

(52) U.S. Cl. ........ 386/241; 386/278; 386/285; 386/286; 386/287

(58) Field of Classification Search ................ 386/1, 46, 386/52, 54, 61, 65, 84, 95–96, 104–105, 386/124–126; 704/200.1, 500
See application file for complete search history.

(56) References Cited

U.S. PATENT DOCUMENTS 5,752,224 A * 5/1998 Tsutsui et al. ................ 704/225
6,263,150 B1 * 7/2001 Okada et al. .................... 386/52

FOREIGN PATENT DOCUMENTS

| | | |
|---|---|---|
| JP | 10-200858 | 7/1998 |
| JP | 10-336641 | 12/1998 |
| JP | 11-75157 A | 3/1999 |
| JP | 2000-165862 A | 6/2000 |
| JP | 2000-175152 A | 6/2000 |
| JP | 2001-359051 | 12/2001 |
| JP | 2002-158974 | 5/2002 |
| JP | 2003-045126 | 2/2003 |
| JP | 2003-092733 | 3/2003 |
| WO | WO 97/13364 | 4/1997 |

* cited by examiner

*Primary Examiner* — Peter-Anthony Pappas
*Assistant Examiner* — Marc Dazenski
(74) *Attorney, Agent, or Firm* — The Nath Law Group; Jerald L. Meyer; Sungyeop Chung

(57) ABSTRACT

At the time of recording, only an edition point is recorded (step S4). At the time of reproduction, overlap time (A_overlap) between an audio frame to be reproduced last and an audio frame to be reproduced first, each including a video connection point is calculated and, further, offset time is calculated on the basis of the overlap time (step S12). Reproducing audio data by using the calculated offset time (step S14) enables reproduction be performed without a gap between audio frames around a connection point. Around connection points, by performing a window function multiplying process on audio data, audio samples are seamlessly connected to each other.

20 Claims, 22 Drawing Sheets

AUDIO/VIDEO RECORDING APPARATUS, RECORDING METHOD, PLAYBACK APPARATUS, PLAYBACK METHOD, PLAYBACK PROGRAM, AND RECORDING PROGRAM

TECHNICAL FIELD

The present invention relates to an audio/video recording apparatus, recording method, reproducing apparatus, reproducing method, and reproducing program. More particularly, the invention relates to an audio/video recording apparatus, recording method, reproducing apparatus, reproducing method, reproducing program, and recording program capable of recording a set of video data and audio data recorded synchronously on a recording medium such as an optical disc, as a video object onto a recording medium and reproducing a plurality of video objects while connecting partly or wholly the video objects.

BACKGROUND ART

There are various methods of recording audio data and video data on a recording medium, which include analog recording and digital recording onto a video tape and analog recording and digital recording onto a disc medium. In recent years, digital recording on a disc medium is becoming mainstream because of its high quality, high accessibility, and the like. A representative example of the digital recording is a DVD (Digital Versatile Disc). High-quality video data and audio data is recorded/reproduced seamlessly to/from recordable media such as DVD-RW and DVD-RAM (refer to, for example, republication of WO97/13364 (FIGS. 47 and 61)).

As a method of encoding video data, generally, the MPEG (Moving Picture Experts Group) video is used. In the MPEG video (mainly, MPEG-2 video), each of frames (or fields) of video data is encoded with types of I picture, P picture, and B picture. The I picture is a picture which can be decoded independently and I stands for “Intra”. The P picture is a picture which is encoded by using forward prediction from an I picture or another P picture, and P stands for “Prediction”. The B picture is a picture which is encoded by using bi-directional prediction from an I picture or a P picture, and B stands for “Bi-directional-prediction”. The video frame period in the NTSC system is about 1/30 second (to be accurate, 1/29.97 second), and that in the PAL system is 1/25 second.

On the other hand, there are, roughly, two kinds of audio data encoding methods which are linear PCM and compression encoding. In the compression encoding, Dolby digital (AC-3), DTS (Digital Theater Systems), MPEG audio, and the like are often used.

In the linear PCM, digital data subjected to sampling and quantization is transmitted. The number of transmission bits is 16, 20, 24, or the like. As the sampling frequency, 48 kHz or the like is used. It is optional to set the audio frame period. For example, 1/600 second (80 samples at 48 kHz) or the like is used.

In the compression encoding, linear PCM data is compressed by using the orthogonal transformation or a psychoacoustic model. As an audio frame period, the number of samples of the second power (or an integral multiple of the number) is often applied. For example, when the number is 1,024 samples at 48 kHz, the audio frame period is about 21 msec (=1,024/48,000). The reason why the number of samples of the second power is used as the audio frame in the compression coding is that the orthogonal transformation for transforming linear PCM sample data to a spectrum is adapted to input/output samples of the second power.

In the case of encoding a video signal with sound and recording the resultant onto a recording medium such as a DVD, video data and audio data is encoded by the encoding method as described above and, further, multiplexed by an MPEG system. The resultant data is recorded, for example, an MPEG program stream onto a recording medium. Such multiplexed stream data will be called a video object (VOB) hereinbelow.

At this time, the video data and audio data in a VOB is synchronized. A video frame period and an audio frame period usually do not coincide with each other but are recorded in different periods. The video frame period is unconditionally determined depending on a TV system. As the audio frame period, an optimum length is separately set in consideration of, for example, efficiency of compression coding. FIG. 1 shows this state.

As shown in FIG. 1, a video frame period ($T_V$) and an audio frame period ($T_A$) are different from each other. This is an example in which a series of video data and audio data is synchronously recorded and is a typical example in which the frame head of the video data and that of the audio data coincide with other in the data head portion. In an intermediate portion of the data, basically, a video frame border and an audio frame border do not coincide with each other (except for a position corresponding to the least common multiple of the video frame period and the audio frame period).

There is an application of performing edition by connecting, in whole or in part, the two VOBs recorded separately from each other and continuously reproducing the resultant. FIG. 2 shows an example of this application. The diagram shows an example of connection from time X in a VOB(i) to time Y in a VOB(j). The characters I, P, and B attached to video frames indicate the above-described types of pictures. It should be noted that, in the diagram, the video frames and audio frames are displayed in the same order as that of reproduction. In an actual VOB, it is necessary to record frames in order of Ii1, Pi1, Bi1, and Bi2 and enable Bi1 and Bi2 to be decoded by using Ii1 and Pi1.

In order to reproduce pictures from time A to time X in VOB(i) and subsequently reproduce pictures from time Y to time B in VOB(j) at the time of reproduction, attention has to be paid to picture types around the times X and Y included in the reproduction path. Specifically, Pi2 is necessary to decode Bi3 and Bi4 in VOB(i) but Pi2 does not exist in the reproduction path. It is therefore necessary to convert Bi4 to a P-picture type Pi4' and convert Bi3 to Bi3' (Bi3' is encoded from Pi1 and Pi4').

Similarly, Ij1 is necessary for decoding Pj1 in VOB(j) but does not exist in the reproduction path. Therefore, for example, Pj1 has to be converted to I picture type Ij1'. In such a manner, data can be reproduced in a path extending via Pi1, Bi3', Pi4', Ij1', Bj3, and Bj4. For convenience, a connection point after connection is Z.

The above description relates to an example of the case where interframe prediction such as MPEG is used as the video encoding system. For example, in the case where encoding completes in each frame like the DV system, such a picture converting process is unnecessary. Also in the case of MPEG or the like, for example, in the case of choosing a connection point such that a frame before the connection point is of a B picture immediately preceding to an I picture and a frame after the connection point is of an I picture, the picture converting process is unnecessary.

Next, reproduction of video frames at a connection point Z will be considered. In the above example, basically, it is requested to reproduce a frame Pi4' for one video frame period and, immediately after that, reproduce an Ij1' frame. That is, seamless reproduction such that video frame pictures are not stopped at the point Z is in demand. To perform the seamless reproduction, it is generally necessary to satisfy the following conditions.

(1) Data of video frames necessary to encode a path extending via A, Z, and B is included in the path (as described above).

(2) Recording data is disposed in a system so as not to cause a buffer underflow in a specific buffer at the time of reading data of the path extending via A, Z, and B. For this purpose, there is a case such that data around Z or the data in the path extending via A, Z, and B is, in whole or in part, re-recorded in a position different from the position before the connection edition.

(3) A process of resetting a system time clock (STC) is performed before and after the connection point Z for the reason that, generally, the time base in VOB(i) and the time base in VOB(j) are different from each other and, therefore, an STC value at the time X and an STC value at the time Y are different from each other.

Handling of an audio frame in the connection edition will now be considered with reference to FIG. 2. In the case of constructing data so as to connect video frames seamlessly as described above, basically, audio frames cannot be connected seamlessly at a connection point. This is because the audio frame period is different from the video frame period, and it cannot be expected that reproduction end time of the final audio frame before the connection point and reproduction start time of the head audio frame after the connection point coincide with each other. Consequently, as shown by G in FIG. 2, the existence of a gap is conventionally allowed between audio frames.

FIG. 3 is a block diagram showing an example of a conventional reproducing apparatus in the case where the connection edition as shown in FIG. 2 is considered.

In the diagram, data in the path extending via A, Z, and B in FIG. 2, which is read from a recording medium 101 by a not-shown reproducing mechanism is input to a demultiplexer 103 via a track buffer 102. The demultiplexer 103 demultiplexes the data to the video stream and the audio stream (or another stream which is not shown), inputs the video stream to a video decoder 105 via a video buffer 104, and inputs the audio stream to an audio decoder 107 via an audio buffer 106.

The video decoder 105 decodes the video, and the audio decoder 107 decodes the audio. In the case where the video encoding system is the MPEG or the like, a re-order buffer 109 for re-arranging pictures in a reproduction order is disposed on the output side of the video decoder 105. An STC circuit 108 is a circuit for counting STCs on the basis of reference time signals such as system clock references (SCR) extracted from VOB data from the demultiplexer 103. The STC circuit 108 also resets the STCs at the connection point Z. The STC circuit 108 also has the role of generating, in a position where a gap occurs in audio reproduction as shown by G in FIG. 2, a control signal (called a mute signal here) indicative of the gap and muting the audio decoder 107 for the period of the gap.

Next, an example in which the reproduction end time X of the final audio frame before the connection point and the reproduction start time Y of the head audio frame after the connection point coincide with each other at the connection edition point as shown in FIG. 4 will be considered. In this case as well, although Pi2 is necessary to decode Bi3 and Bi4 in VOB(i), Pi2 does not exist in the reproduction path. It is therefore necessary to convert, for example, Bi4 to a P-picture type Pi4' and convert Bi3 to Bi3' (Bi3' is encoded from Pi1 and Pi4').

Similarly, Ij1 is necessary to decode Pj1 in VOB(j), but Ij1 does not exist in the reproduction path. Therefore, it is necessary to convert, for example, Pj1 to the I picture type Ij1'. In such a manner, data can be reproduced in a path extending via Pi1, Bi3', Pi4', Ij1', Bj3, and Bj4.

On the other hand, with respect to audio data, the reproduction end time X of the final audio frame before the connection point and the reproduction start time Y of the head audio frame before the connection point coincide with each other at the connection edition point. Consequently, as shown in FIG. 4, no gap is created between the audio frame before the connection point and the audio frame after the connection point.

DISCLOSURE OF INVENTION

The conventional audio/video recording/reproducing method and apparatus described above has a problem in reproduction of audio at a connection point in edition of connecting arbitrary VOBs. Specifically, with seamless connection of video frames as a basis, in the case of seamlessly reproducing video frames in a path extending via A, Z, and B as shown in FIG. 2, a problem occurs such that a gap G is created between an audio frame before the connection point and an audio frame after the connection point, mute momentarily occurs at the gap point around the point Z in audio reproduction, and seamless reproduction cannot be performed.

As shown in FIG. 4 even in the case where the reproduction end time X of the final audio frame before the connection point and the reproduction start time Y of the head audio frame after the connection point coincide with each other at the connection edition point, the final audio sample value before the connection point and the first audio sample value after the connection point are generally discontinuous, so that noise occurs at the connection point Z between a decoded audio waveform "a" before the connection point and a decoded audio waveform "b" after the connection point as shown in FIG. 5. Such discontinuity of audio samples is a problem which occurs when inherently discontinuous audio frames are connected to each other basically in all of systems of encoding an audio signal as a time waveform without performing orthogonal transformation, such as linear PCM and MPEG audio layers I and II.

The present invention has been achieved in view of the above points and an object of the invention is to provide an audio/video recording apparatus, recording method, reproducing apparatus, reproducing method, reproducing program, and recording program of seamlessly connecting two different sets of audio data and video data recorded on a recording medium such as an optical disc and reproducing the resultant without noises.

To achieve the object, according to a first invention, an audio/video recording apparatus for, at the time of recording a set of synchronized video data and audio data as a video object onto a recording medium, recording a reproduction sequence for connecting and reproducing a plurality of video objects in part or in whole onto the recording medium so that the reproduction sequence can be designated, includes: audio encoding means that performs encoding including a window function multiplying process and an orthogonal transformation process on an audio signal to be recorded and outputs the audio data; video data changing means that changes the video data as necessary so that a video frame to be reproduced last in a video object and a video frame to be reproduced first in the following video object are reproduced seamlessly at a connection point; edition point determining means that determines an edition point of the audio frame so that a period of reproducing an audio frame to be reproduced last in the video object includes time of the connection point of the video frames and a period of reproducing an audio frame to be reproduced first in the following video object includes the time of the connection point; and recording means that records the edition point as registration information onto the recording medium.

In the invention, at the time of recording a reproduction sequence for connecting and reproducing a plurality of video objects in part or in whole onto a recording medium so that the reproduction sequence can be designated, video data is changed as necessary so that a video frame to be reproduced last in a video object and a video frame to be reproduced first in the following video object are reproduced seamlessly at a connection point, an edition point of the audio frame is determined so that a period of reproducing an audio frame to be reproduced last in the video object includes time of the connection point of the video frames and a period of reproducing an audio frame to be reproduced first in the following video object includes the time of the connection point, and the edition point is recorded as management information onto the recording medium, so that it is unnecessary to calculate overlap time and offset time at the time of recording.

To achieve the object, a second invention provides an audio/video recording method for, at the time of recording a set of synchronized video data and audio data as a video object onto a recording medium, recording a reproduction sequence for connecting and reproducing a plurality of video objects in part or in whole onto the recording medium so that the reproduction sequence can be designated, comprising: a first step of performing encoding including a window function multiplying process and an orthogonal transformation process on an audio signal to be recorded and outputting the audio data; a second step of changing the video data as necessary so that a video frame to be reproduced last in a video object and a video frame to be reproduced first in the following video object are reproduced seamlessly at a connection point; a third step of determining an edition point of the audio frame so that a period of reproducing an audio frame to be reproduced last in the video object includes time of the connection point of the video frames and a period of reproducing an audio frame to be reproduced first in the following video object includes the time of the connection point; and a fourth step of recording the edition point as management information onto the recording medium. According to the invention, like the first invention, it is unnecessary to calculate the overlap time and offset time on recording.

To achieve the object, according to a third invention, an audio/video reproducing apparatus for reproducing video data and audio data on the basis of reproduction management information from a recording medium on which a video object and management information is recorded by the recording apparatus of the first invention includes: overlap time calculating means for calculating time of overlap between an audio frame to be reproduced last in a video object and an audio frame to be reproduced first in the following video object so as to include the edition point obtained from the reproduction management information; offset time calculating means that sets the calculated overlap time as audio PTS offset time to be used at the time of reproducing an audio frame of the following video object when the edition point is the first connection point in a designated reproduction sequence, calculates a value obtained by adding the calculated overlap time and audio PTS offset time at the immediately preceding connection point as audio PTS offset time at the present edition point when the edition point is any of the second and subsequent connection points in the reproduction sequence, and outputs an audio drop flag of a predetermined value indicating that it is unnecessary to reproduce an audio frame to be reproduced last in the video object at the time of connection under a predetermined condition; resetting means that resets a system time clock (STC) of the apparatus so as to seamlessly connect video frames to be connected at each of connection points of the video objects included in the reproduction sequence; offset means that offsets PTS of an audio frame read from the recording medium in accordance with the calculated audio PTS offset time; video data reproducing means that reproduces video data reproduced from the recording medium in accordance with video PTS accompanying the video data; audio frame reproducing means that reproduces an audio frame reproduced from the recording medium in accordance with the offset PTS and, when the audio drop flag shows the predetermined value, controls so as not to reproduce an audio frame to be reproduced last in the video object; and audio decoding means that performs decoding including a window function multiplying process and an orthogonal inverse transformation process on the audio frame reproduced by the audio frame reproducing means and outputs an audio signal.

In the invention, overlap time between an audio frame to be reproduced last in a video object and an audio frame to be reproduced first in the following video object is calculated so as to include the edition point obtained from the reproduction management information, and audio PTS offset time for offsetting the PTS in the audio frame read from the recording medium is calculated, so that an audio frame reproduced from the recording medium can be reproduced in accordance with the offset PTS.

To achieve the object, according to a fourth invention, an audio/video reproducing method for reproducing video data and audio data on the basis of reproduction management information from a recording medium on which a video object and management information is recorded by the recording method of the second invention includes: a first step of calculating time of overlap between an audio frame to be reproduced last in a video object and an audio frame to be reproduced first in the following video object so as to include the edition point obtained from the reproduction management information; a second step of setting the calculated overlap time as audio PTS offset time to be used at the time of reproducing an audio frame of the following video object when the edition point is the first connection point in a designated reproduction sequence, calculating a value obtained by adding the calculated overlap time and audio PTS offset time at the immediately preceding connection point as audio PTS offset time at the present edition point when the edition point is any of the second and subsequent connection points in the reproduction sequence, and outputting an audio drop flag of a predetermined value indicating that it is unnecessary to reproduce an audio frame to be reproduced last in the video object at the time of connection under a predetermined condition; a third step of resetting a system time clock (STC) of the apparatus so as to seamlessly connect video frames to be connected at each of connection points of the video objects included in the reproduction sequence; a fourth step of offsetting PTS of an audio frame read from the recording medium in accordance with the audio PTS offset time calculated in the second step; a fifth step of reproducing video data that is reproduced from the recording medium in accordance with video PTS accompanying the video data; a sixth step of reproducing an audio frame that is reproduced from the recording medium in accordance with the PTS which is offset in the fourth step and, when the audio drop flag that is output in the third step shows the predetermined value, controlling so as not to reproduce an audio frame to be reproduced last in the video object; and a seventh step of performing decoding including a window function multiplying process and an orthogonal inverse transformation process on the audio frame reproduced in the sixth step.

In the invention, like the third invention, overlap time between an audio frame to be reproduced last in a video object and an audio frame to be reproduced first in the following video object is calculated so as to include the edition point obtained from the reproduction management information, and audio PTS offset time for offsetting the PTS in the audio frame read from the recording medium is calculated, so that an audio frame reproduced from the recording medium can be reproduced in accordance with the offset PTS.

To achieve the object, according to the sixth invention, an audio/video recording apparatus for, at the time of recording a set of synchronized video data and audio data as a video object onto a recording medium, recording a reproduction sequence for connecting and reproducing a plurality of video objects in part or in whole onto the recording medium so that the reproduction sequence can be designated, includes: audio encoding means that performs encoding including a window function multiplying process and an orthogonal transformation process on an audio signal to be recorded and outputs the audio data; multiplexing means that multiplexes the audio data and the video data to generate the video object; control means that controls the multiplexing means so that an audio buffer occupation amount is equal to or less than a value obtained by subtracting a data amount of one audio frame from the upper limit of a specific audio buffer size, and generates a flag indicative of an audio multiplex state at the time of multiplexing by the multiplexing means; and recording means that records the video object output from the multiplexing means controlled by the control means onto the recording medium together with a flag indicative of the audio multiplex state generated by the control means.

In the invention, audio data is multiplexed on video data and the resultant is recorded so that an audio buffer occupation amount is equal to or less than a value obtained by subtracting a data amount of one audio frame from the upper limit of a specific audio buffer size. Consequently, even in the case of performing reproduction with a delay of maximum one audio frame period, occurrence of an overflow in the audio buffer is prevented.

To achieve the object, an audio/video recording apparatus of a seventh invention has, in addition of the components of the sixth invention, video data changing means that changes the video data as necessary so that a video frame to be reproduced last in a video object and a video frame to be reproduced first in the following video object are reproduced seamlessly at a connection point; means that determines an edition point in an audio frame so that a period of reproducing an audio frame of a video object and a period of reproducing an audio frame in the following video object partly overlap each other around the connection point, and edits the audio frames, and second recording means that records the edition point as registration information onto the recording medium.

To achieve the object, according to an eighth invention, an audio/video recording method of, at the time of recording a set of synchronized video data and audio data as a video object onto a recording medium, recording a reproduction sequence for connecting and reproducing a plurality of video objects in part or in whole onto the recording medium so that the reproduction sequence can be designated, includes: a first step of performing encoding including a window function multiplying process and an orthogonal transformation process on an audio signal to be recorded and outputting the audio data; a second step of controlling so that an audio buffer occupation amount is equal to or less than a value obtained by subtracting a data amount of one audio frame from the upper limit of a specific audio buffer size at the time of multiplexing the audio data and the video data; and a third step of recording a flag indicative of an audio multiplex state under control of the second step onto the recording medium together with the video object obtained by multiplexing under the control of the second step.

In the invention, audio data is multiplexed on video data and the resultant is recorded so that an audio buffer occupation amount is equal to or less than a value obtained by subtracting a data amount of one audio frame from the upper limit of a specific audio buffer size. Consequently, even in the case of performing reproduction with a delay of maximum one audio frame period, occurrence of an overflow in the audio buffer is prevented.

To achieve the object, an audio/video recording method of a ninth invention includes, in addition to the steps of the eighth invention, a fourth step of changing the video data as necessary so that a video frame to be reproduced last in a video object and a video frame to be reproduced first in the following video object are reproduced seamlessly at a connection point; a fifth step of determining an edition point in an audio frame so that a period of reproducing an audio frame of a video object and a period of reproducing an audio frame in the following video object partly overlap each other around the connection point and editing the audio frames; and a sixth step of recording the edition point as management information onto the recording medium.

To achieve the object, a tenth invention provides an audio/video reproducing apparatus for reproducing video data and audio data on the basis of reproduction management information from a recording medium on which a video object and management information is recorded by the recording apparatus of the seventh invention, including: overlap time calculating means that calculates time of overlap between an audio frame to be reproduced last in a video object and an audio frame to be reproduced first in the following video object with respect to an edition point in the reproduction management information; offset time calculating means that sets the calculated overlap time as audio PTS offset time to be used at the time of reproducing an audio frame of the following video object when the edition point is the first connection point in a designated reproduction sequence, calculates a value obtained by adding the calculated overlap time and audio PTS offset time at the immediately preceding connection point as audio PTS offset time at the present edition point when the edition point is any of the second and subsequent connection points in the reproduction sequence, and outputs an audio drop flag of a predetermined value indicating that it is unnecessary to reproduce an audio frame to be reproduced last in the video object at the time of connection under a predetermined condition; resetting means that resets a system time clock (STC) of the apparatus so as to seamlessly connect video frames to be connected at each of connection points of the video objects included in the reproduction sequence; offset means that offsets PTS of an audio frame read from the recording medium in accordance with the calculated audio PTS offset time; video data reproducing means that reproduces video data reproduced from the recording medium in accordance with video PTS accompanying the video data; audio frame reproducing means that reproduces an audio frame reproduced from the recording medium in accordance with the offset PTS and, when the audio drop flag shows the predetermined value, controls so as not to reproduce an audio frame to be reproduced last in the video object; and audio decoding means that performs decoding including a window function multiplying process and an orthogonal inverse transformation process on the audio frame reproduced by the audio frame reproducing means and outputs an audio signal.

In the invention, even in the case where reproduction is performed with a delay of maximum one audio frame period at the time of reproduction of video data and audio data from a recording medium on which audio data is multiplexed on video data and the resultant is recorded so that an audio buffer occupation amount is equal to or less than a value obtained by subtracting a data amount of one audio frame from the upper limit of a specific audio buffer size, occurrence of an overflow in the audio buffer is prevented.

To achieve the object, an audio/video reproducing apparatus of an eleventh invention is characterized in that when the audio PTS offset time at the calculated connection point is longer than a period of "n" times (where n is 1 or ½) of audio frame time, the offset time calculating means of the third or tenth invention calculates a value obtained by subtracting the audio frame period from the audio PTS offset time as final audio PTS offset time, and outputs an audio drop flag of a predetermined value indicating that it is unnecessary to reproduce an audio frame to be reproduced last in the video object at the time of connection.

In the invention, an amount of asynchronization between a audio frame and a video frame after a connection point is an amount of one audio frame period or less or a ±0.5 audio frame period or less, which cannot be basically detected as a lip-sync deviation.

To achieve the object, a twelfth invention provides an audio/video reproducing method for reproducing video data and audio data on the basis of reproduction management information from a recording medium on which a video object and management information is recorded by the recording method of the ninth invention and the method performs reproduction by first to seventh steps similar to those of the fourth invention. Time of overlap between an audio frame to be reproduced last in a video object and an audio frame to be reproduced first in the following video object so as to include an edition point obtained from the reproduction management information is calculated, and audio PTS offset time for offsetting PTS in an audio frame read from a recording medium is calculated. Thus, an audio frame reproduced from the recording medium can be reproduced according to the PTS which is offset.

To achieve the object, an audio/video reproducing method of a thirteenth invention is characterized in that, in the second step of the fourth or twelfth invention, when the audio PTS offset time at the calculated connection point is longer than a period of "n" times (where n is 1 or ½) of audio frame period, a value obtained by subtracting the audio frame period from the audio PTS offset time is calculated as final audio PTS offset time, and an audio drop flag of a predetermined value indicating that it is unnecessary to reproduce an audio frame to be reproduced last in the video object at the time of connection is output.

In the invention, an amount of asynchronization between a audio frame and a video frame after a connection point is an amount of one audio frame period or less or a ±0.5 audio frame period or less, which cannot be basically detected as a lip-sync deviation.

To achieve the object, an audio/video reproducing program of the fifth invention or a fourteenth invention is characterized by making a computer execute a reproducing method of reproducing video data and audio data on the basis of a reproduction sequence from a recording medium on which a video object and the reproduction sequence are recorded by the recording method of the second invention or the ninth invention.

To achieve the invention, a fifteenth invention provides an audio/video recording apparatus for, at the time of recording a set of synchronized video data and audio data as a video object onto a recording medium, recording a reproduction sequence for connecting and reproducing a plurality of video objects in part or in whole onto the recording medium so that the reproduction sequence can be designated, comprising: audio encoding means that performs encoding including a window function multiplying process and an orthogonal transformation process on an audio signal to be recorded and outputs the audio data; video data changing means that changes the video data as necessary so that a video frame to be reproduced last in a video object and a video frame to be reproduced first in the following video object are reproduced seamlessly at a connection point; edition point determining means that determines an edition point in the audio frame so that a period of reproducing an audio frame to be reproduced last in the video object includes time of the connection point of the video frames and a period of reproducing an audio frame to be reproduced first in the following video object includes the time of the connection point; overlap time calculating means for calculating time of overlap between the audio frame to be reproduced last and the audio frame to be reproduced first so as to include the connection time; and recording means that records at least the overlap time as management information onto the recording medium.

In the invention, at the time of recording a reproduction sequence for connecting and reproducing a plurality of video objects in part or in whole onto the recording medium so that the reproduction sequence can be designated, the video data is changed as necessary so that a video frame to be reproduced last in a video object and a video frame to be reproduced first in the following video object are reproduced seamlessly at a connection point, an edition point in the audio frame is determined so that a period of reproducing an audio frame to be reproduced last in the video object includes time of the connection point of the video frames and a period of reproducing an audio frame to be reproduced first in the following video object includes the time of the connection point, and time of overlap between the audio frame to be reproduced last and the audio frame to be reproduced first is calculated so as to include the connection time, and recorded as management information onto the recording medium. Consequently, it is unnecessary to calculate the overlap time upon reproduction.

To achieve the object, a sixteenth invention provides an audio/video recording method of, at the time of recording a set of synchronized video data and audio data as a video object onto a recording medium, recording a reproduction sequence for connecting and reproducing a plurality of video objects in part or in whole onto the recording medium so that the reproduction sequence can be designated, comprising: a first step of performing encoding including a window function multiplying process and an orthogonal transformation process on an audio signal to be recorded and outputting the audio data; a second step of changing the video data as necessary so that a video frame to be reproduced last in a video object and a video frame to be reproduced first in the following video object are reproduced seamlessly at a connection point; a third step of determining an edition point in an audio frame so that a period of reproducing an audio frame to be reproduced last in the video object includes time of the connection point of the video frames and a period of reproducing an audio frame to be reproduced first in the following video object includes the time of the connection point; a fourth step of calculating time of overlap between the audio frame to be reproduced last and the audio frame to be reproduced first so as to include the connection time; and a fifth step of recording at least the overlap time as management information onto the recording medium.

In the invention, like the fifteenth invention, time of overlap between the audio frame to be reproduced last and the audio frame to be reproduced first each including the connection time is calculated and recorded as management information onto the recording medium, so that it is unnecessary to calculate overlap time upon reproduction.

To achieve the object, a seventeenth invention provides an audio/video reproducing apparatus for reproducing video data and audio data on the basis of a reproduction sequence from a recording medium on which a video object and the reproduction sequence are recorded by the recording apparatus of the fifteenth invention, comprising: overlap time reproducing means that reproduces the overlap time from the recording medium; offset time calculating means that sets the overlap time reproduced from the recording medium as audio PTS offset time to be used at the time of reproducing an audio frame of the following video object when the connection point is the first connection point in the reproduction sequence, calculates a value obtained by adding the overlap time reproduced from the recording medium and audio PTS offset time at the immediately preceding connection point as audio PTS offset time at the present edition point when the connection point is any of the second and subsequent connection points in the reproduction sequence, and outputs an audio drop flag of a predetermined value indicating that it is unnecessary to reproduce an audio frame to be reproduced last in the video object at the time of connection under a predetermined condition; resetting means that resets a system time clock (STC) of the apparatus so as to seamlessly connect video frames to be connected at each of connection points of the video objects included in the reproduction sequence; offset means that offsets PTS of an audio frame read from the recording medium in accordance with the calculated audio PTS offset time; video data reproducing means that reproduces video data reproduced from the recording medium in accordance with video PTS accompanying the video data; audio frame reproducing means that reproduces an audio frame reproduced from the recording medium in accordance with the offset PTS and, when the audio drop flag shows the predetermined value, controls so as not to reproduce an audio frame to be reproduced last in the video object; and audio decoding means that performs decoding including a window function multiplying process and an orthogonal inverse transformation process on the audio frame reproduced by the audio frame reproducing means and outputs an audio signal.

In the invention, depending on whether the connection point read from the recording medium is the first connection point in the reproduction sequence or any of the second and subsequent connection points on the basis of the overlap time read from the recording medium upon reproduction, the audio PTS offset time at the immediately preceding connection point is calculated as audio PTS offset time at the present edition point, an audio drop flag of a predetermined value is output under a predetermined condition, and PTS of an audio frame read from the recording medium is offset in accordance with the calculated audio PTS offset time. Consequently, it becomes unnecessary to calculate audio PTS offset time for seamless reproduction of audio data on the reproduction side.

To achieve the object, an audio/video reproducing apparatus of an eighteenth invention is characterized in that when the audio PTS offset time at the calculated connection point is longer than a period of "n" times (where n is 1 or ½) of audio frame time, the offset time calculating means in the seventeenth invention calculates a value obtained by subtracting the audio frame period from the audio PTS offset time as final audio PTS offset time, and outputs an audio drop flag of a predetermined value indicating that it is unnecessary to reproduce an audio frame to be reproduced last in the video object at the time of connection.

In the invention, an amount of asynchronization between a audio frame and a video frame after a connection point is an amount of one audio frame period or less or a ±0.5 audio frame period or less, which cannot be basically detected as a lip-sync deviation.

To achieve the object, a nineteenth invention provides an audio/video reproducing method for reproducing video data and audio data on the basis of a reproduction sequence from a recording medium on which a video object and a reproduction sequence are recorded by the sixteenth invention, comprising: a first step of reproducing the overlap time from the recording medium; a second step of setting the overlap time reproduced from the recording medium as audio PTS offset time to be used at the time of reproducing an audio frame of the following video object when the connection point is the first connection point in the reproduction sequence, calculating a value obtained by adding the overlap time reproduced from the recording medium and audio PTS offset time at the immediately preceding connection point as audio PTS offset time at the present edition point when the connection point is any of the second and subsequent connection points in the reproduction sequence, and outputting an audio drop flag of a predetermined value indicating that it is unnecessary to reproduce an audio frame to be reproduced last in the video object at the time of connection under a predetermined condition; a third step of resetting a system time clock (STC) of the apparatus so as to seamlessly connect video frames to be connected at each of connection points of the video objects included in the reproduction sequence; a fourth step of offsetting PTS of an audio frame read from the recording medium in accordance with the audio PTS offset time calculated in the second step; a fifth step of reproducing video data that is reproduced from the recording medium in accordance with video PTS accompanying the video data; a sixth step of reproducing an audio frame that is reproduced from the recording medium in accordance with the PTS which is offset in the fourth step and, when the audio drop flag that is output in the third step shows the predetermined value, controlling so as not to reproduce an audio frame to be reproduced last in the video object; and a seventh step of performing decoding including a window function multiplying process and an orthogonal inverse transformation process on the audio frame reproduced in the sixth step and outputting an audio signal.

In the invention, like the seventeenth invention, audio PTS offset time is calculated as audio PTS offset time at the present edition point on the basis of overlap time read from the recording medium, and PTS of an audio frame read from the recording medium is offset in accordance with the calculated audio PTS offset time. Thus, it is unnecessary to calculate the audio PTS offset time for seamless reproduction of audio data on the reproduction side.

To achieve the object, a twentieth invention provides an audio/video reproducing method characterized in that, in the second step of the nineteenth invention, when the audio PTS offset time at the calculated connection point is longer than a period of "n" times (where n is 1 or ½) of audio frame time, a value obtained by subtracting the audio frame period from the audio PTS offset time is calculated as final audio PTS offset time, and an audio drop flag of a predetermined value indicating that it is unnecessary to reproduce an audio frame to be reproduced last in the video object at the time of connection is output.

Further, to achieve the object, a twenty-first invention provides an audio/video reproducing program for making a computer execute an audio/video reproducing method of reproducing video data and audio data on the basis of a reproduction sequence from a recording medium on which a video object and the reproduction sequence are recorded by the recording method of the sixteenth invention.

To achieve the object, a twenty-second invention provides an audio/video recording apparatus for, at the time of recording a set of synchronized video data and audio data as a video object onto a recording medium, recording a reproduction sequence for connecting and reproducing a plurality of video objects in part or in whole onto the recording medium so that the reproduction sequence can be designated, comprising: audio encoding means that performs encoding including a window function multiplying process and an orthogonal transformation process on an audio signal to be recorded and outputs the audio data; video data changing means that changes the video data as necessary so that a video frame to be reproduced last in a video object and a video frame to be reproduced first in the following video object are reproduced seamlessly at a connection point; edition point determining means that determines an edition point in the audio frame so that a period of reproducing an audio frame to be reproduced last in the video object includes time of the connection point of the video frames and a period of reproducing an audio frame to be reproduced first in the following video object includes the time of the connection point; overlap time calculating means for calculating time of overlap between the audio frame to be reproduced last and the audio frame to be reproduced first so as to include the connection time; offset time calculating means for, when the connection point is the first connection point in the reproduction sequence, setting the overlap time as audio PTS offset time used at the time of reproducing an audio frame in the video object and, when the connection point is any of the second and subsequent connection points in the reproduction sequence, calculating a value obtained by adding the overlap time and audio PTS offset time at the immediately preceding connection point as audio PTS offset time at the present connection point; and recording means that records at least the audio PTS offset time as management information onto the recording medium.

In the invention, at the time of recording a reproduction sequence for connecting and reproducing a plurality of video objects in part or in whole onto the recording medium so that the reproduction sequence can be designated, the video data is changed as necessary so that a video frame to be reproduced last in a video object and a video frame to be reproduced first in the following video object are reproduced seamlessly at a connection point, and an edition point in the audio frame is determined so that a period of reproducing an audio frame to be reproduced last in the video object includes time of the connection point of the video frames and a period of reproducing an audio frame to be reproduced first in the following video object includes the time of the connection point. When the connection point is the first connection point in the reproduction sequence, the overlap time is set as audio PTS offset time used at the time of reproducing an audio frame in the video object. When the connection point is any of the second and subsequent connection points in the reproduction sequence, a value obtained by adding the overlap time and audio PTS offset time at the immediately preceding connection point is calculated as audio PTS offset time at the present connection point and recorded as management information onto the recording medium. Thus, the amount of asynchronization deviation between an audio frame and a video frame after a connection point can be reduced to an amount which basically cannot be detected as a lip-sync deviation.

To achieve the object, in an audio/video recording apparatus of a twenty-third invention, when the audio PTS offset time at the calculated connection point is longer than a period of "n" times (where n is 1 or ½) of an audio frame period, the offset time calculating means of the twenty-second invention calculates a value obtained by subtracting the audio frame period from the audio PTS offset time as final audio PTS offset time and outputs an audio drop flag of a predetermined value indicating that it is unnecessary to reproduce an audio frame to be reproduced last in the video object at the time of connection, and the recording means records the audio PTS offset time and the audio drop flag as the management information onto the recording medium. In the invention, the amount of asynchronization deviation between an audio frame and a video frame after a connection point can be reduced to an amount which basically cannot be detected as a lip-sync deviation.

To achieve the object, a twenty-fourth invention provides an audio/video recording method for, at the time of recording a set of synchronized video data and audio data as a video object onto a recording medium, recording a reproduction sequence for connecting and reproducing a plurality of video objects in part or in whole onto the recording medium so that the reproduction sequence can be designated, comprising: a first step of performing encoding including a window function multiplying process and an orthogonal transformation process on an audio signal to be recorded and outputting the audio data; a second step of changing the video data as necessary so that a video frame to be reproduced last in a video object and a video frame to be reproduced first in the following video object are reproduced seamlessly at a connection point; a third step of determining an edition point in the audio frame so that a period of reproducing an audio frame to be reproduced last in the video object includes time of the connection point of the video frames and a period of reproducing an audio frame to be reproduced first in the following video object includes the time of the connection point; a fourth step of calculating time of overlap between the audio frame to be reproduced last and the audio frame to be reproduced first so as to include the connection time; a fifth step of, when the connection point is the first connection point in the reproduction sequence, setting the overlap time as audio PTS offset time used at the time of reproducing an audio frame in the video object and, when the connection point is any of the second and subsequent connection points in the reproduction sequence, calculating a value obtained by adding the overlap time and audio PTS offset time at the immediately preceding connection point as audio PTS offset time at the present connection point; and a sixth step of recording at least the audio PTS offset time as management information onto the recording medium. In the invention, like the audio/video recording apparatus of the twenty-second invention, the amount of asynchronization deviation between an audio frame and a video frame after a connection point can be reduced to an amount which basically cannot be detected as a lip-sync deviation.

To achieve the object, a twenty-fifth invention provides an audio/video recording method in which, in the fifth step of the twenty-fourth invention, when the audio PTS offset time at the calculated connection point is longer than a period of "n"

times (where n is 1 or ½) of an audio frame period, a value obtained by subtracting the audio frame period from the audio PTS offset time is calculated as final audio PTS offset time, and an audio drop flag of a predetermined value indicating that it is unnecessary to reproduce an audio frame to be reproduced last in the video object at the time of connection is output and, in the sixth step, the audio PTS offset time and the audio drop flag are recorded as the management information onto the recording medium.

In the invention, like the audio/video recording apparatus of the twenty-third invention, the amount of asynchronization deviation between an audio frame and a video frame after a connection point can be reduced to an amount of one audio frame period or less or a ±0.5 audio frame period which basically cannot be detected as a lip-sync deviation.

To achieve the object, a twenty-sixth invention provides an audio/video reproducing apparatus for reproducing video data and audio data on the basis of a reproduction sequence from a recording medium on which a video object and the reproduction sequence is recorded by a recording apparatus according to the twenty-second or twenty-third invention, comprising: resetting means that resets a system time clock (STC) of the apparatus so as to seamlessly connect video frames to be connected at each of connection points of the video objects included in the reproduction sequence; offset means that offsets PTS of an audio frame read from the recording medium in accordance with the audio PTS offset time which is read from the recording medium; video data reproducing means that reproduces video data reproduced from the recording medium in accordance with video PTS accompanying the video data; audio data reproducing means that reproduces audio data reproduced from the recording medium in accordance with the offset PTS; drop processing means that, when the audio drop flag reproduced from the recording medium shows the predetermined value, controls so as not to reproduce an audio frame to be reproduced last in the video object; and audio decoding means that performs decoding including a window function multiplying process and an orthogonal inverse transformation process on the audio data reproduced by the audio data reproducing means and outputs an audio signal.

In the invention, the PTS of the audio frame read from the recording medium is offset in accordance with the audio PTS offset time read from the recording medium upon reproduction, so that it is unnecessary to calculate the audio PTS offset time for seamless reproduction of audio data on the reproduction side.

To achieve the object, a twenty-seventh invention provides an audio/video reproducing method for reproducing video data and audio data on the basis of a reproduction sequence from a recording medium on which a video object and the reproduction sequence are recorded by a recording apparatus according to the twenty-second or twenty-third invention, comprising: a first step of resetting a system time clock (STC) of the apparatus so as to seamlessly connect video frames to be connected at each of connection points of the video objects included in the reproduction sequence; a second step of offsetting PTS of an audio frame read from the recording medium in accordance with the audio PTS offset time which is read from the recording medium; a third step of reproducing video data reproduced from the recording medium in accordance with video PTS accompanying the video data; a fourth step of reproducing audio data reproduced from the recording medium in accordance with the offset PTS; a fifth step of, when the audio drop flag reproduced from the recording medium shows the predetermined value, controlling so as not to reproduce an audio frame to be reproduced last in the video object; and a sixth step of performing decoding including a window function multiplying process and an orthogonal inverse transformation process on the audio data reproduced in the fourth step.

In the invention, like the audio/video reproducing apparatus of the twenty-sixth invention, the PTS of the audio frame read from the recording medium is offset in accordance with the audio PTS offset time read from the recording medium upon reproduction, so that it is unnecessary to calculate the audio PTS offset time for seamless reproduction of audio data on the reproduction side.

A twenty-eighth invention provides an audio/video recording program for making a computer execute the audio/video recording method of the twenty-fourth invention. A twenty-ninth invention provides an audio/video reproducing program for making a computer execute the audio/video reproducing method of the twenty-seventh invention.

BEST MODE FOR CARRYING OUT THE INVENTION

Embodiments of the present invention will be described hereinbelow with reference to the drawings.

Figure 1:
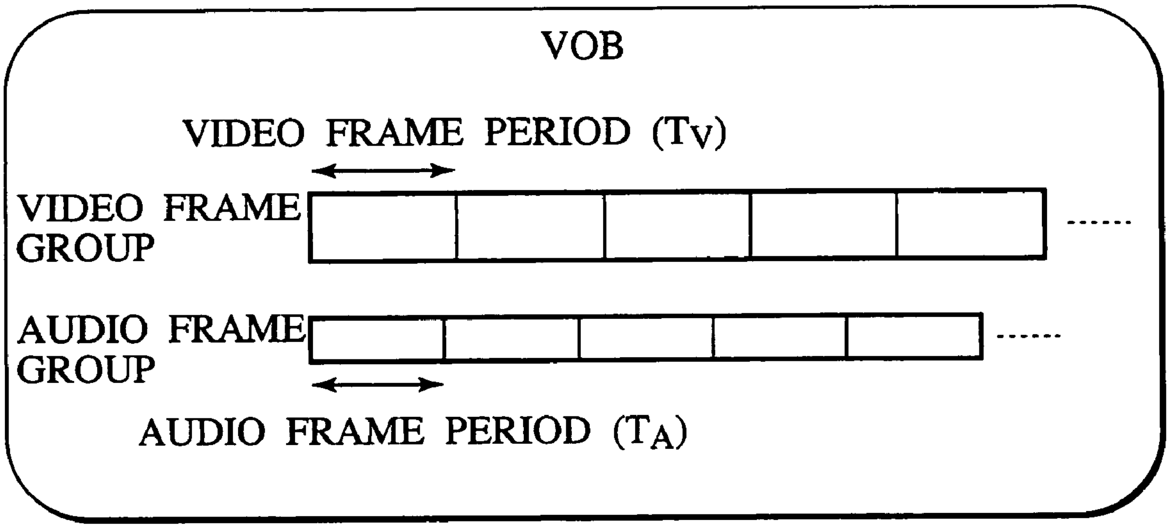
FIG. 1 is a diagram showing an example of the relation between a video frame and an audio frame.
Figure 2:
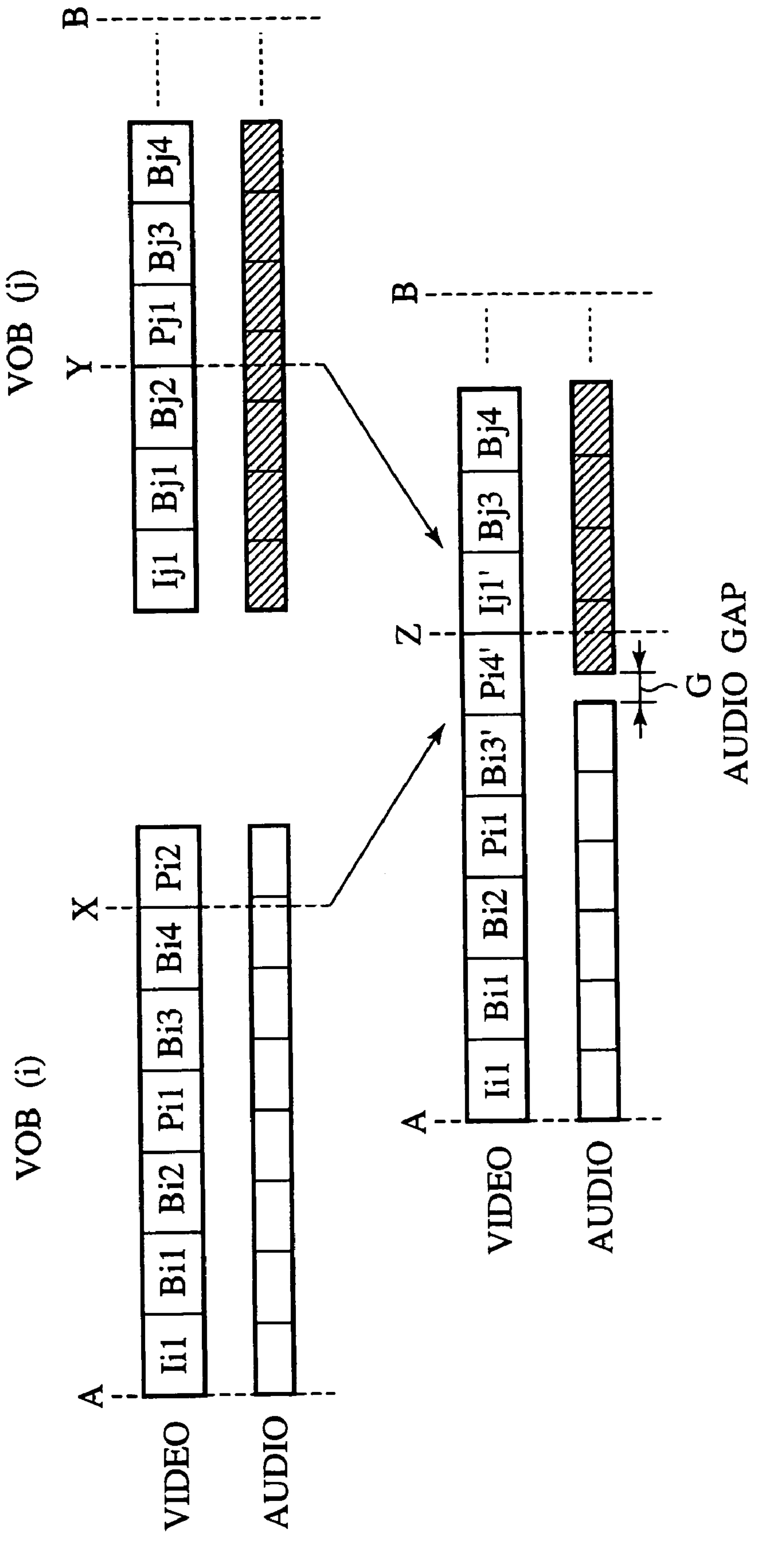
FIG. 2 is a conceptual diagram showing conventional connection edition and video/audio reproduction.
Figure 3:
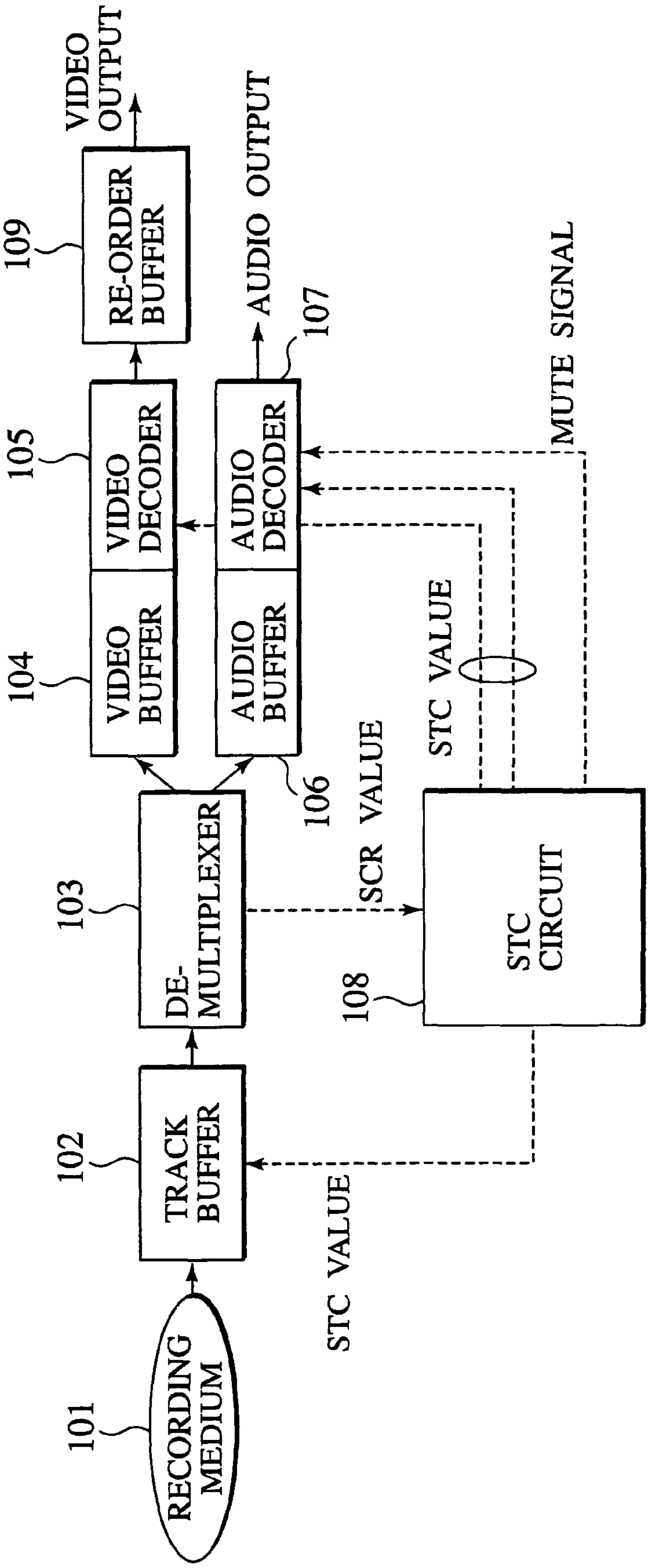
FIG. 3 is a block diagram showing an example of a conventional reproducing apparatus.
Figure 4:
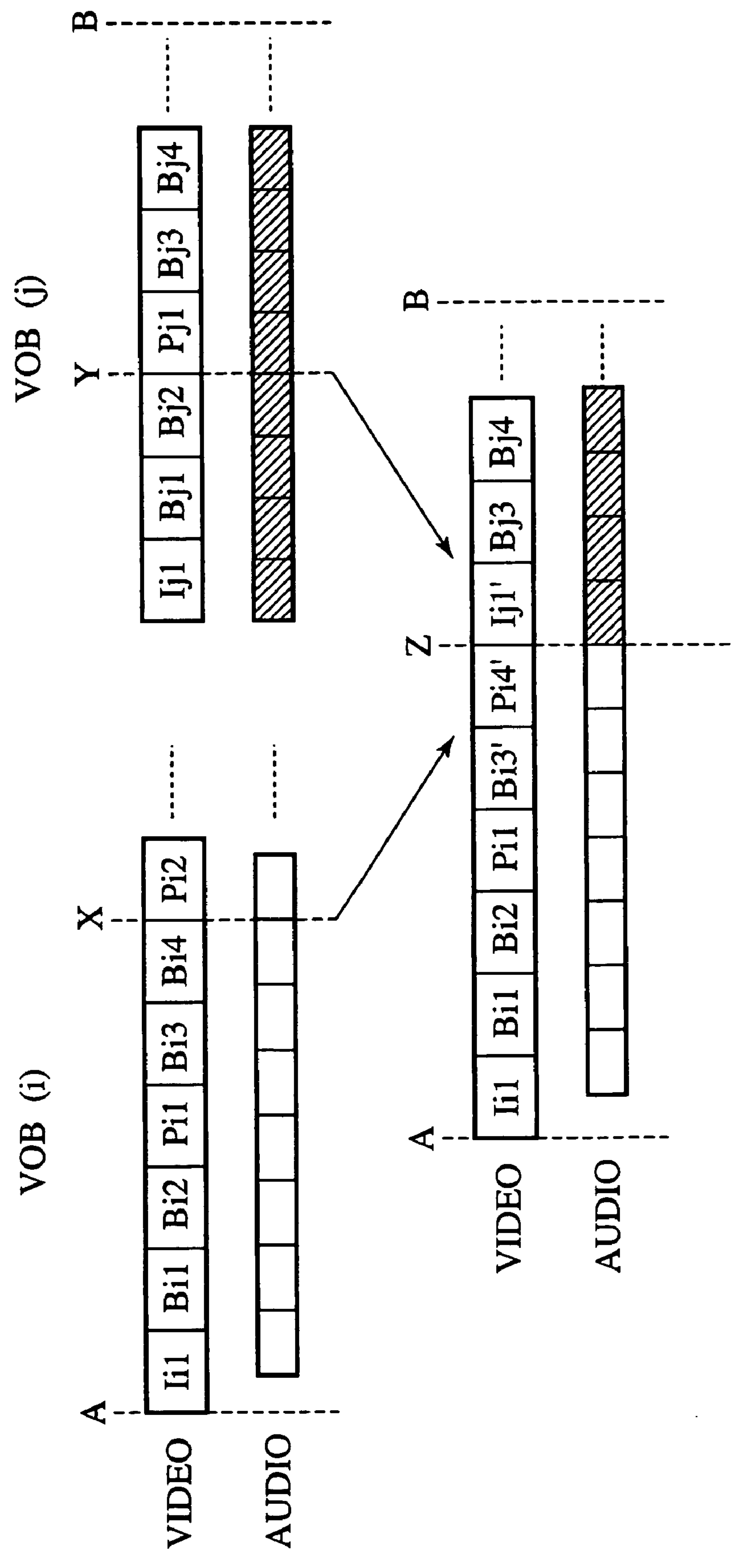
FIG. 4 is another conceptual diagram showing conventional connection edition and video/audio reproduction.
Figure 5:
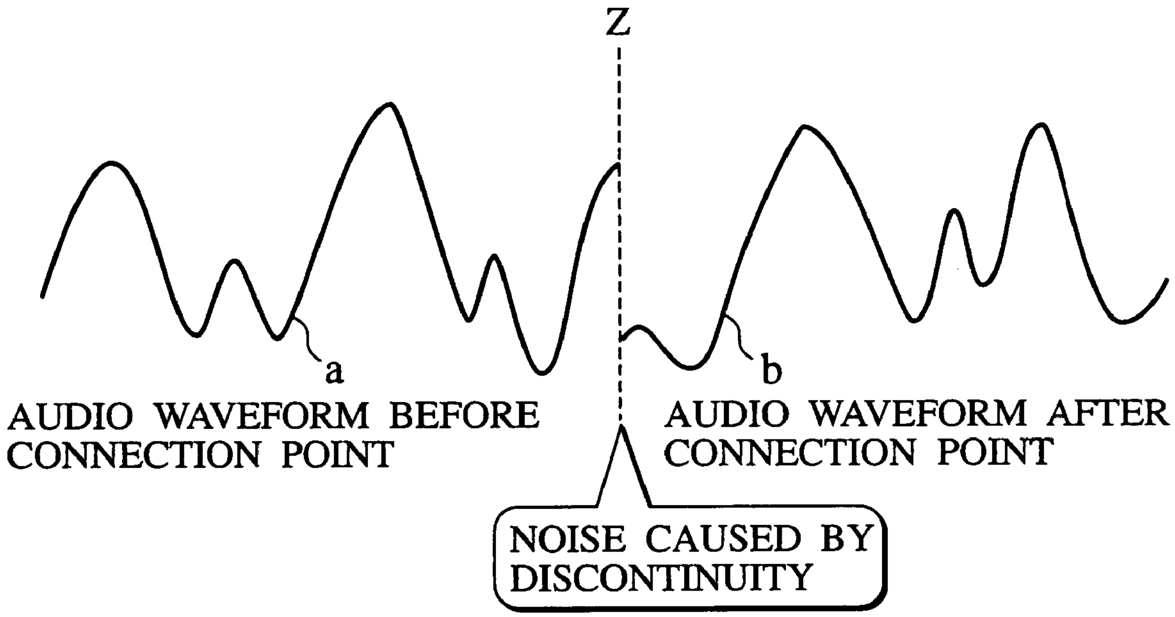
FIG. 5 shows an example of an audio waveform at a connection point in a conventional technique.
Figure 6:
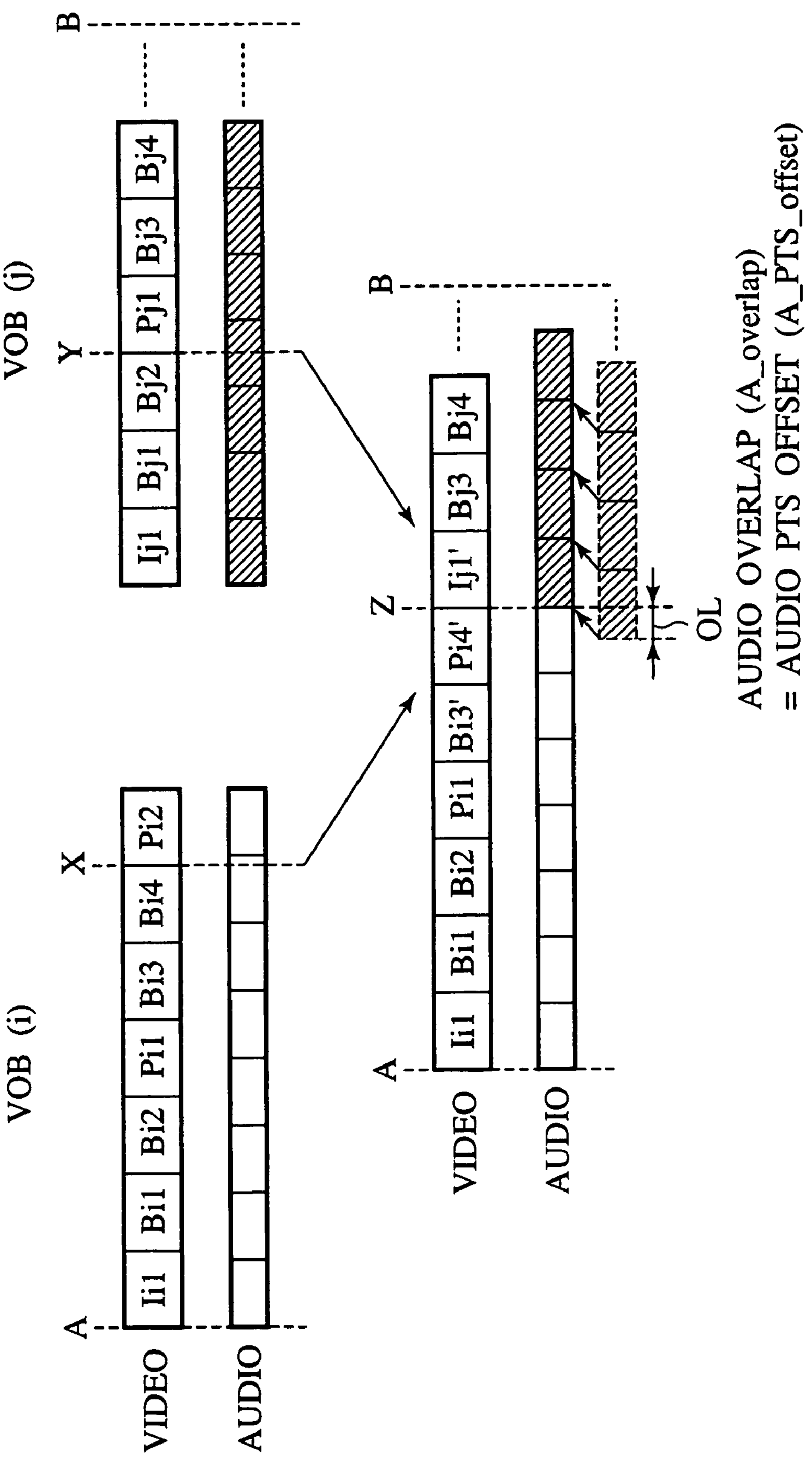
FIG. 6 is a conceptual diagram showing connection edition and video/audio reproduction in the present invention.

FIG. 6 shows an example of connection edition and video/audio reproduction in an embodiment of an audio/video recording apparatus, recording method, reproducing apparatus, reproducing method, and reproducing program according to the invention. In the diagram, the same reference numerals are given to the same parts as those in FIG. 2 and their description will not be repeated. The embodiment of FIG. 6 relates to an example of connection from time X in VOB(i) to time Y in VOB(j) in a manner similar to the conventional technique of FIG. 2 but is different from the conventional technique with respect to the following two points.

(1) The valid final audio frame in VOB(i) after connection edition is an audio frame including the time X (including the case where the reproduction end time of the audio frame is the same as the time X (*1)). Similarly, the valid first audio frame in VOB(j) after the connection edition is an audio frame including the time Y (including the case where the reproduction start time of the audio frame is the same as the time Y (*2)). That is, the final audio frame of VOB(i) and the first audio frame of VOB(j) overlap each other at the point Z after connection. An overlap portion indicated by OL in FIG. 6 will be called an audio overlap (A_overlap) in the specification. When the cases *1 and *2 are simultaneously satisfied, A_overlap is zero.

(2) In audio reproduction of VOB(j), reproduction is performed while offsetting the reproduction time (PTS: Presentation Time Stamp) of an audio frame only by the amount of canceling the portion A_overlap. The offset amount will be called an audio PTS offset (A_PTS_offset) in the specification.

In the embodiment, as described above, an audio frame of a following VOB is offset, and audio frames can be connected without a gap at/around the connection point, so that one of the problems is solved.

To prevent occurrence of noise due to discontinuity at the connection point, in the embodiment, selection of the audio encoding system is devised.

Figure 7:
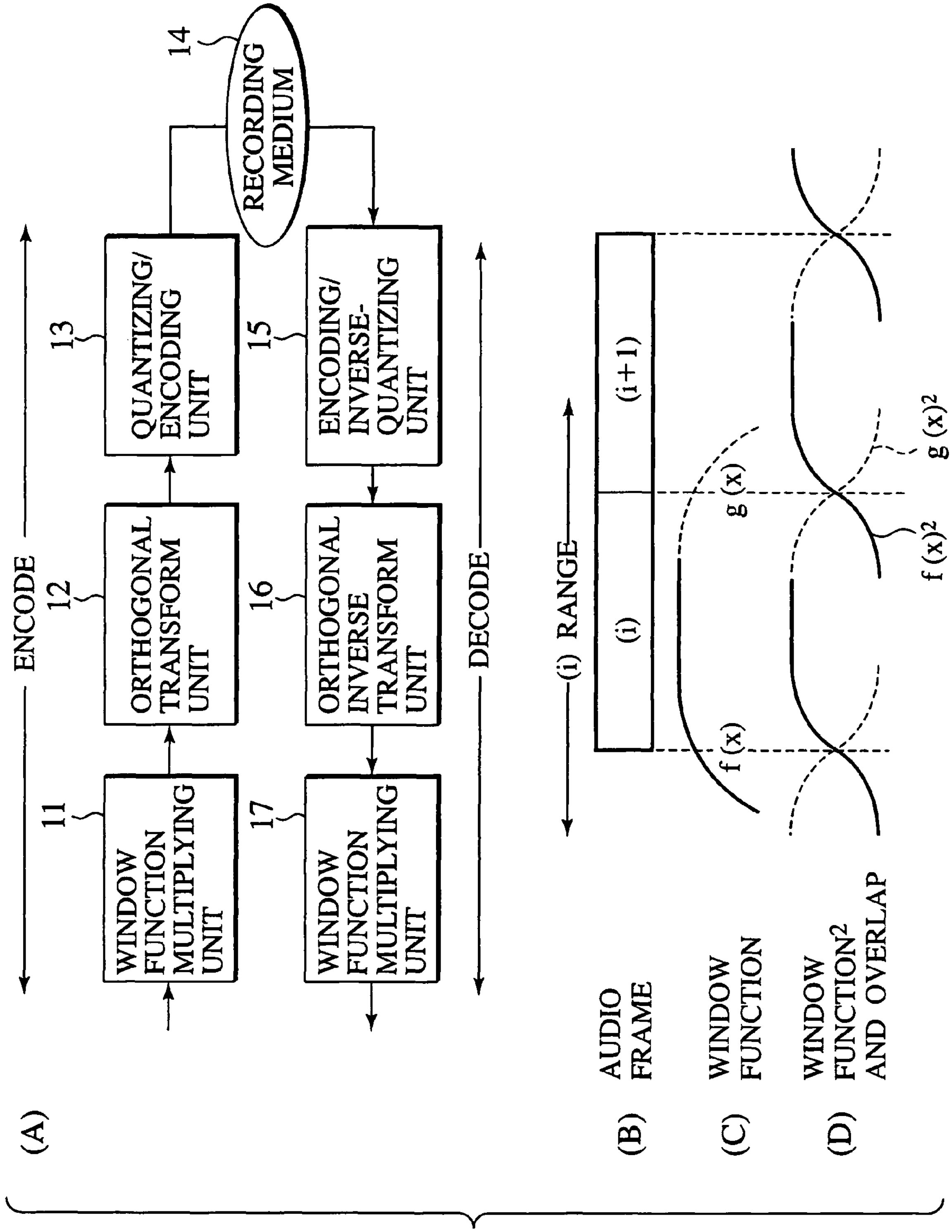
FIG. 7 shows a block diagram showing an embodiment of an audio encode block and an audio decode block of a main part of the invention, and an example of a window function.

FIG. 7(A) is a block diagram showing an embodiment of an audio encode block and an audio decode block in an audio/video recording apparatus and reproducing apparatus of the invention.

As shown in FIG. 7(A), in the audio encode block, an input audio signal is subjected to a window function multiplying process using a window function in a window function multiplying unit 11. After that, the resultant signal is supplied to an orthogonal transform unit 12 and subjected to orthogonal transformation. Further, the resultant signal is supplied to a quantizing/encoding unit 13 where it is quantized on the basis of a predetermined sampling frequency and, after that, subjected to compression encoding of a predetermined system. The compressed audio data obtained as a result is recorded together with video data compressed by a not-shown video data recording system, as an MPEG program stream by multiplication of an MPEG system by a not-shown multiplexer onto a recording medium 14 by known recording means.

On the other hand, the multiplexed stream reproduced by known reproducing means from the recording medium 14 is demultiplexed into audio data and video data by a not-shown demultiplexer. The video data is output to a not-shown video data reproducing system, and the audio data is supplied to a decoding/inverse-quantizing unit 15 in the audio decode block. The decoded and inverse-quantized audio data is subjected to orthogonal inverse transformation in an orthogonal inverse transform unit 16. The resultant data is supplied to a window function multiplying unit 17 and subjected to a window function multiplying process of multiplication using a predetermined window function, thereby decoding the data to an audio signal.

The window function used in the window function multiplying units 11 and 17 will now be described with reference to FIGS. 7(B) to 7(D). As shown in FIG. 7(C), the window function of an audio frame has a bilaterally symmetrical shape with a left shoulder f(x) and a right shoulder g(x). The existence of the flat portion in the center is arbitrary. Between neighboring audio frames (i) and (i+1) schematically shown in FIG. 7(B), a window function g(x) portion in the audio frame (i) and a window function f(x) portion in the audio frame (i+1) overlap each other.

It should be noted that an audio sample to be actually encoded in the audio frame (i) is the portion indicated by the range (i) in FIG. 7(B). Considering that multiplication using the window function is executed total twice in the window function multiplying unit 11 on the encoding side and the window function multiplying unit 17 on the decoding side, the following equation 1 has to be satisfied in the overlap portion between the audio frames (i) and (i+1).

$$f(x)^2+g(x)^2=1.0 \qquad \text{Equation 1}$$

Examples of such a window function are as follows.

$$f(x)=\sin(x) \qquad \text{Equation 2}$$

$$g(x)=\cos(x) \qquad \text{Equation 3}$$

Any function can be used as long as Equation 1 is satisfied.

In the case of employing the audio encoding system using such a window function, even if audio frames which are inherently discontinuous are connected, as shown in FIG. 7(D), audio samples can be combined smoothly by the window functions $f(X)^2$ and $g(X)^2$ of multiplication of twice, so that noise due to discontinuous frames does not occur at a connection point. Therefore, the second problem is solved. That is, by the above techniques, total two problems are solved, and seamless connection of audio frames is realized.

<Connection Edition and Video/Audio Reproduction of First Embodiment>

Figure 8:
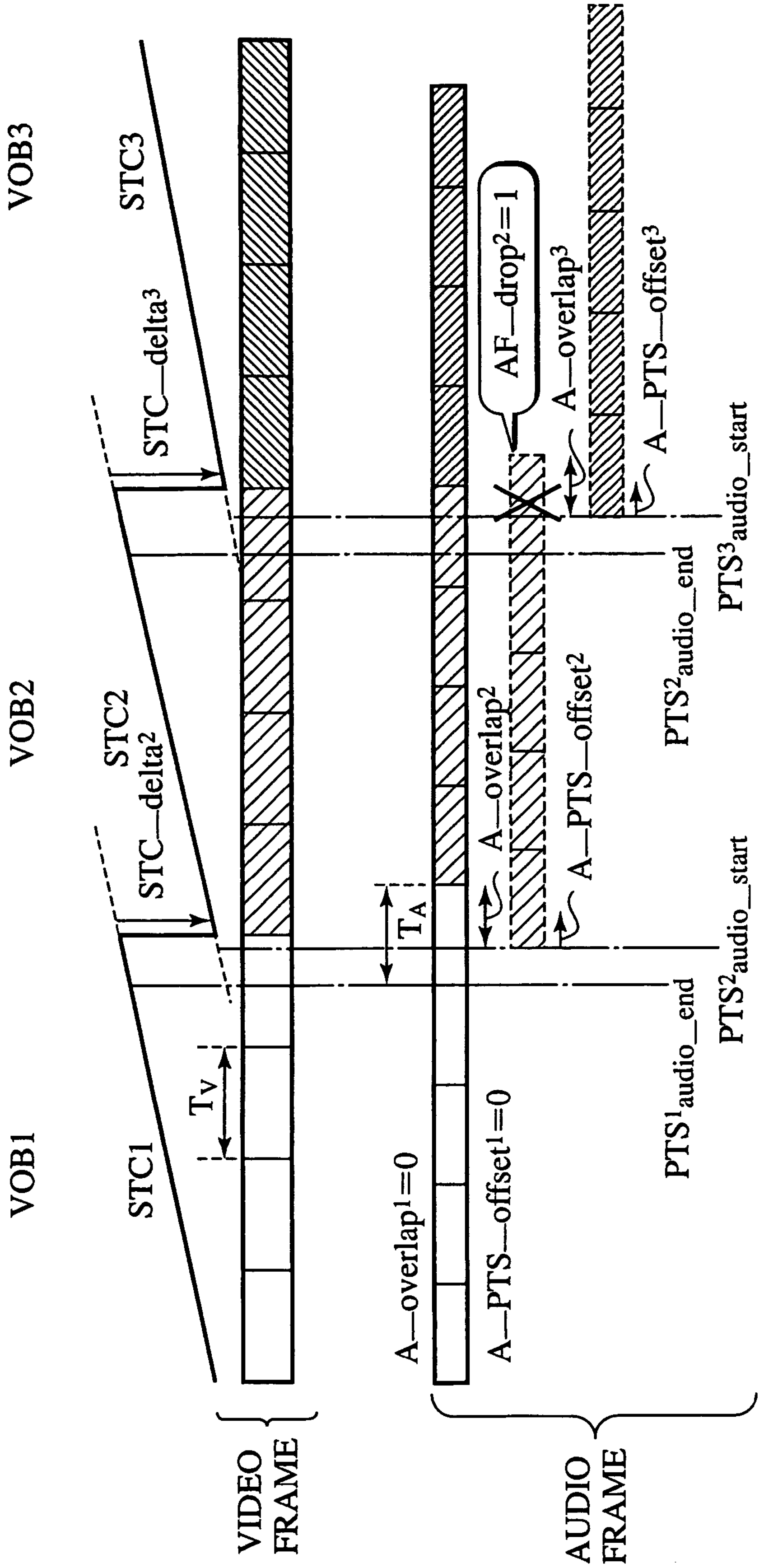
FIG. 8 is a conceptual diagram showing connection edition and video/audio reproduction of a first embodiment of the invention.
Figure 15:
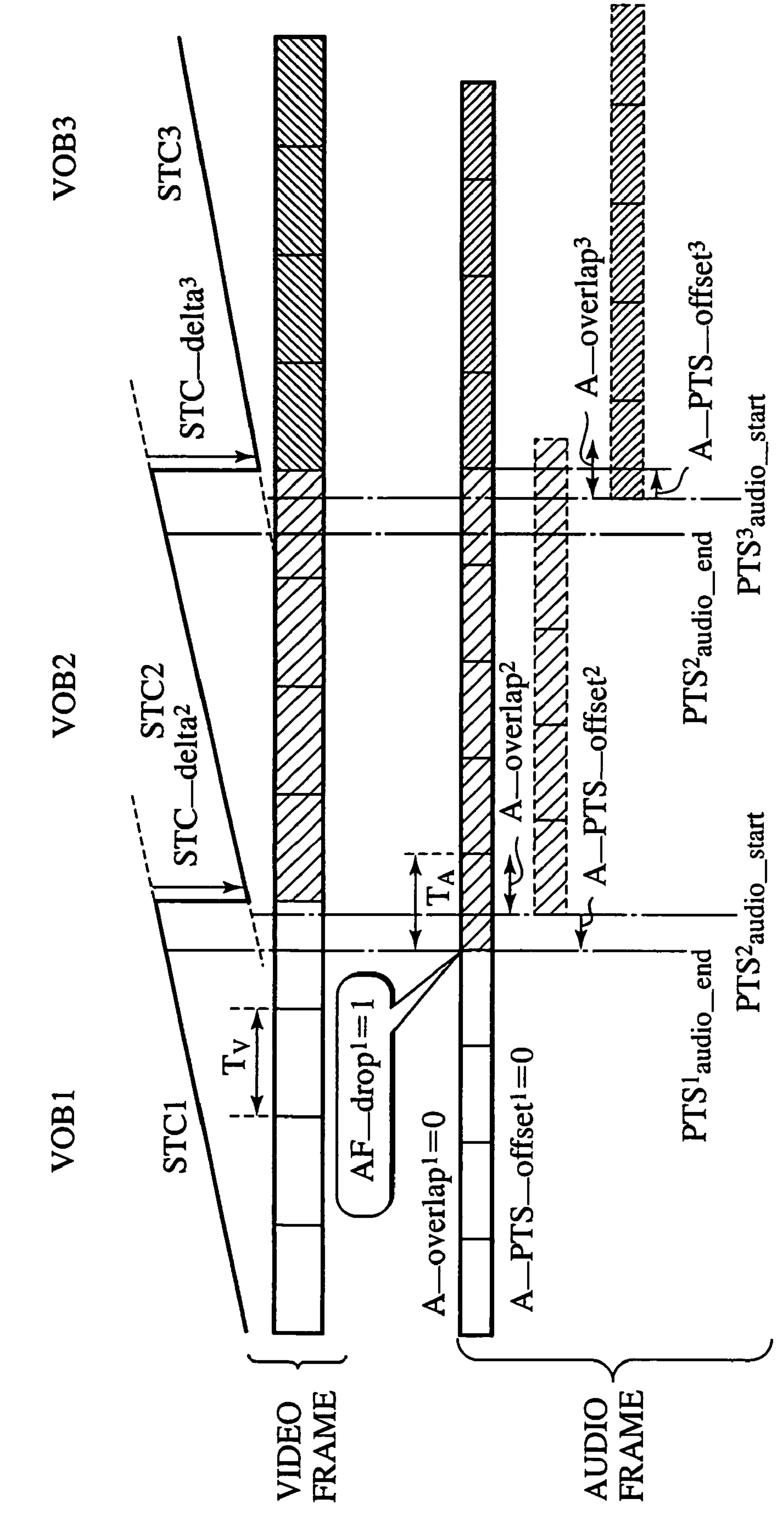
FIG. 15 is a conceptual diagram showing connection edition and video/audio reproduction of a second embodiment of the invention.

Next, the first embodiment will be described in detail by using the diagrams and related equations. FIG. 8 shows the first embodiment of the video/audio recording method and reproducing method in the case of connection-editing, partially, VOB1, VOB2, and VOB3 in this order (a diagram of VOB1, VOB2, and VOB3 before connection is not provided. It should be noted that, although the number of video/audio frames included in each VOB is small in FIG. 8 for convenience, a group of frames corresponding to tens seconds to a few hours can be included in each VOB in reality). In FIG. 8 and FIG. 15 which will be described later, $T_V$ denotes a video frame period already described.

In FIG. 8, an audio frame group indicated by a dotted-line rectangle shows a state before connection, and an audio frame group indicated by a solid-line rectangle shows a state after connection. On the other hand, all of video frame groups are displayed in the state after connection. Hereinbelow, variables and the like used in the embodiment will be described with reference to FIG. 8 and subsequent diagrams. In the following, k denotes a positive integer. In the example of FIG. 8, any of 1, 2, and 3 is used.

In FIG. 8, STCk is a schematic expression of count-up of an STC value used during reproduction of VOBk. $STC\_delta^k$ denotes the difference between STC(k−1) and STCk and is expressed by the following equation.

$$STC\_delta^k = STC(k-1) - STCk \qquad \text{Equation 4}$$

$T_A$ denotes, as described above, an audio frame period. $A\_overlap^k$ denotes overlap time of audio frames between VOBk and VOB(k−1). In this example, VOB1 is positioned at the head, so that $A\_overlap^1=0$.

$A\_PTS\_offset^k$ denotes, as described above, offset time necessary for an audio PTS at the time of reproduction of VOBk. In this example, VOB1 is at the head, so that $A\_PTS\_offset^1=0$. $PTS^k$audio_end denotes reproduction start time (PTS value) of the final audio frame in VOBk. This is the value before connection edition.

$PTS^k$audio_start denotes reproduction start time (PTS value) of the first audio frame in VOBk. This is the value before connection edition. At this time, $A\_overlap^k$ can be calculated as follows.

$$A\_overlap^k = (PTS^{k-1}audio\_end + T_A) - (PTS^k audio\_start + STC\_delta^k) \qquad \text{Equation 5}$$

In the second term of the right side of Equation 5, to map the time on STCk onto STC(k−1), $STC\_delta^k$ is added.

Since $A\_PTS\_offset^k$ denotes basically an amount of offsetting an audio frame group in the following VOB so as to set $A\_overlap^k$ to zero, when k=2 in FIG. 8, the following equation is satisfied.

$$A\_PTS\_offset^2 = A\_overlap^2 \qquad \text{Equation 6}$$

Further, when k=3 in FIG. 8, since the audio frame group in VOB2 is already offset only by the amount of $A\_PTS\_offset^2$ when k=2, an overlap amount of $A\_PTS\_offset^2$ is added in addition to inherent $A\_overlap^3$. To set this to zero, when k=3, the following equation is basically required.

$$A\_PTS\_offset^3 = A\_overlap^3 + A\_PTS\_offset^2 \qquad \text{Equation 7}$$

Therefore, the following general equation is satisfied.

$$A\_PTS\_offset^k = A\_overlap^k + A\_PTS\_offset^{k-1} \qquad \text{Equation 8}$$

In the case where $A\_PTS\_offset^k$ is larger than the audio frame period $T_A$, by dropping the final audio frame in VOB (k−1), the amount of $A\_PTS\_offset^k$ can be reduced. In FIG. 8, the frame marked with X is dropped. The conditional equation is shown below. $AF\_drop^{k-1}$ denotes an audio drop flag which has the value 1 in the case of dropping the final audio frame in VOB(k−1) (the value 0 when the final audio frame is not dropped). In the example of FIG. 8, $AF\_drop^2=1$.

Equation 9

$$\text{If}(A\_PTS\_offset^k >= T_A)\{$$

$$A\_PTS\_offset^k = A\_PTS\_offset^k - T_A;$$

$$AF\_drop^{k-1} = 1;$$

$$\}\text{else } AF\_drop^{k-1} = 0;$$

By performing such a dropping process, also in the case where the number of connection times of VOB increases, the value of A_PTS_offset can be prevented from being accumulated and becoming excessively large.

In the invention, reproduction is performed while offsetting the audio frame in VOBk after connection only by the amount of A_PTS_offset from the synchronization relation with the inherent video frame. Generally, the offset exerts an influence on lip-sync. It is said that deterioration in lip-sync can be detected when the offset becomes larger than one or two video frame periods. Therefore, the value of A_PTS_offset is, preferably, not too large. For example, when the audio frame period $T_A$ is the video frame period $T_V$ or less, it is effective to suppress A_PTS_offset to be within the audio frame period $T_A$.

<Example I of Audio/Video Recording Apparatus>

Figure 9:
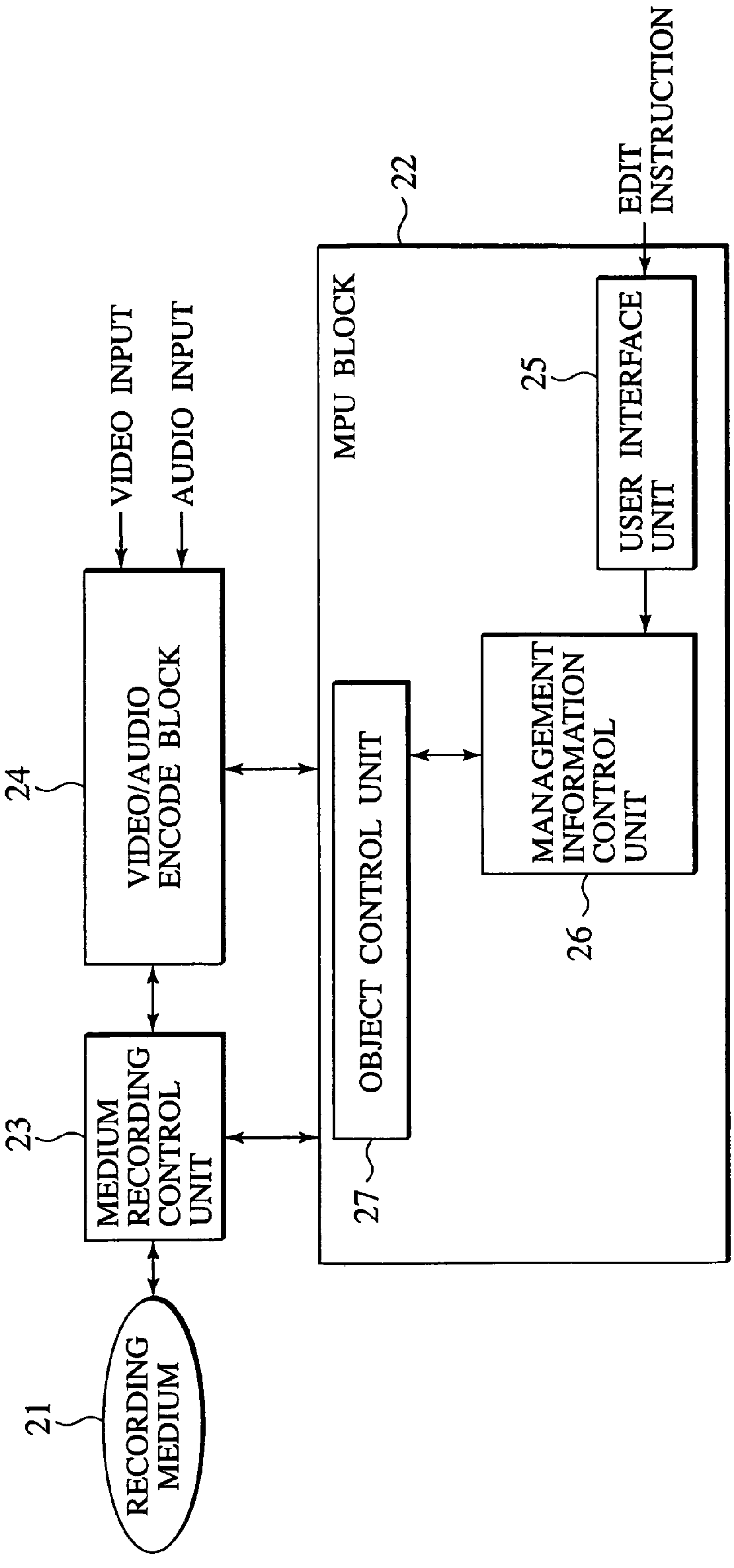
FIG. 9 is a block diagram showing Example I of an audio/video recording apparatus of the invention.

Example I of the audio/video recording apparatus according to the invention will now be described. FIG. 9 is a block diagram showing Example I of the audio/video recording apparatus of the invention. On assumption that recording of a plurality of VOBs has been finished, operation of the connection edition on the VOBs will be described.

In FIG. 9, a user interface unit 25, a management information control unit 26, and an object control unit 27 construct an MPU block 22 and are realized by software process of an MPU (Micro Processing Unit).

First, an edition instruction is given from the user via the user interface unit 25. The management information control unit 26 checks a connection edition point by using corresponding management information. At this time, as described above, the edition point in an audio frame is determined first so that overlap of audio frames exists at the connection point. Next, for video frames, a picture type converting process is performed as necessary by the object control unit 27, a vide/audio encode block 24, and a medium recording control unit 23, and the resultant is written onto a recording medium 21.

<Example I of Audio/Video Recording Method>

Next, calculation and recording for audio seamless connection is performed. Calculation and recording for audio seamless connection of Example I of the audio/video recording method of the invention will be described with reference to the flowchart of FIG. 10.

First, in the management information control unit 26, VOBs to be connected are determined and a video connection point (a connection point between a video frame to be reproduced last in the VOB before the connection point and a video frame to be reproduced first in the VOB after the connection point) is determined (step S1). Next, whether the video picture type changing process is necessary or not is determined in correspondence with the video connection point and, if necessary, a change is concretely prepared (step S2).

Next, in correspondence with the video connection point, an audio frame edition point is determined (step S3). Specifically, the audio frame edition point is determined so that the period of reproducing the audio frame to be reproduced last in the VOB before the connection point includes time of the video connection point, and the period of reproducing the audio frame to be reproduced first in the VOB after the connection point includes time of the video connection point. Finally, the VOB after edition (data around the connection point) is written on the recording medium 21 via the object control unit 27 and the medium recording control unit 23 (step S4). At this time, the information at the edition point is also written as management information onto the recording medium 21. The audio encode block in the video/audio encode block 24 has a configuration on the encode side in FIG. 7(A).

Figure 10:
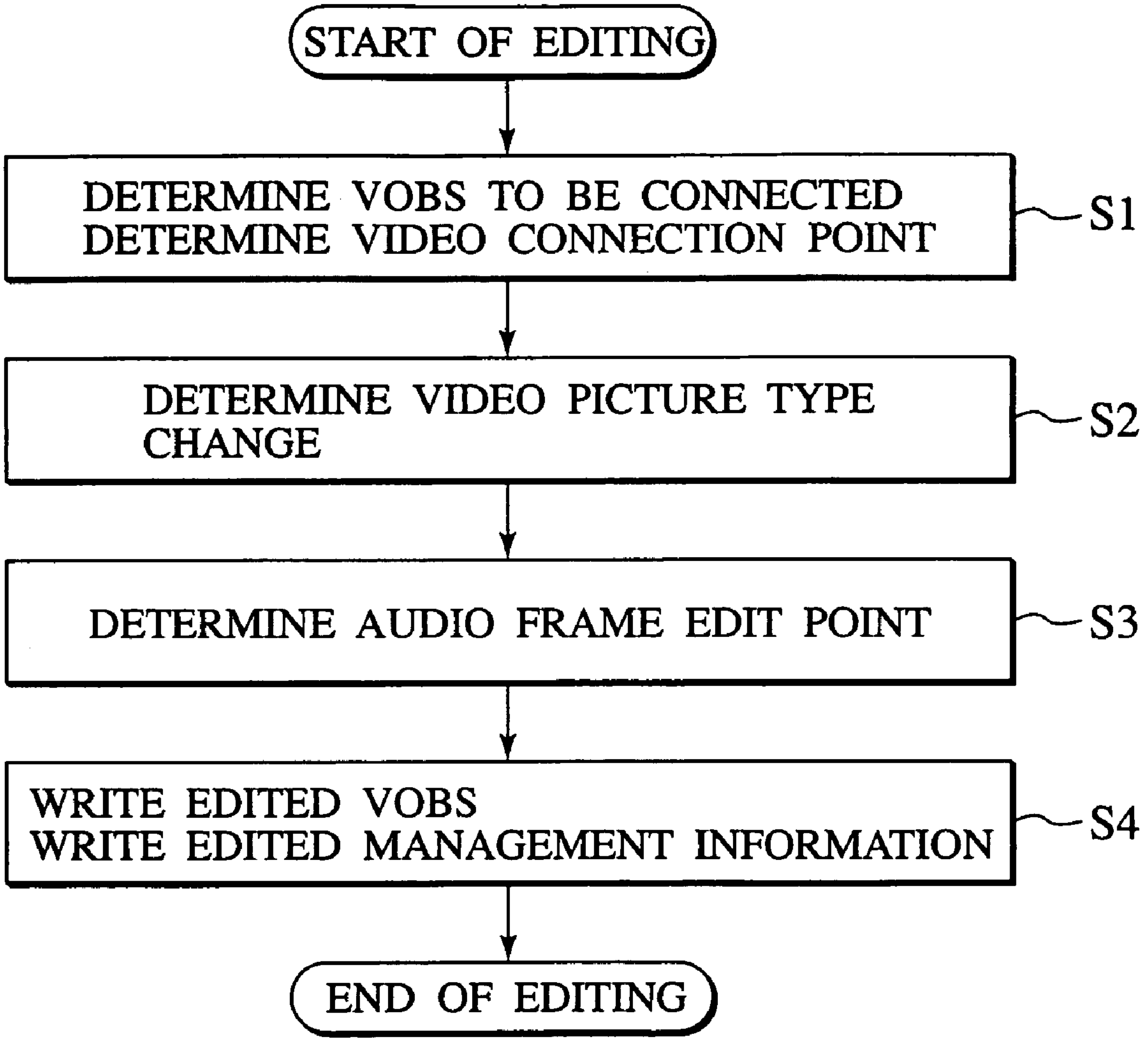
FIG. 10 is a flowchart of Example I of an audio/video recording method of the invention.

It is to be noted that the recording method described by referring to FIG. 10 can be carried out by a dedicated apparatus as illustrated in FIG. 9 and also as a program on a computer having a recording function of the recording medium.

<Example I of Audio/Video Reproducing Apparatus>

Figure 11:
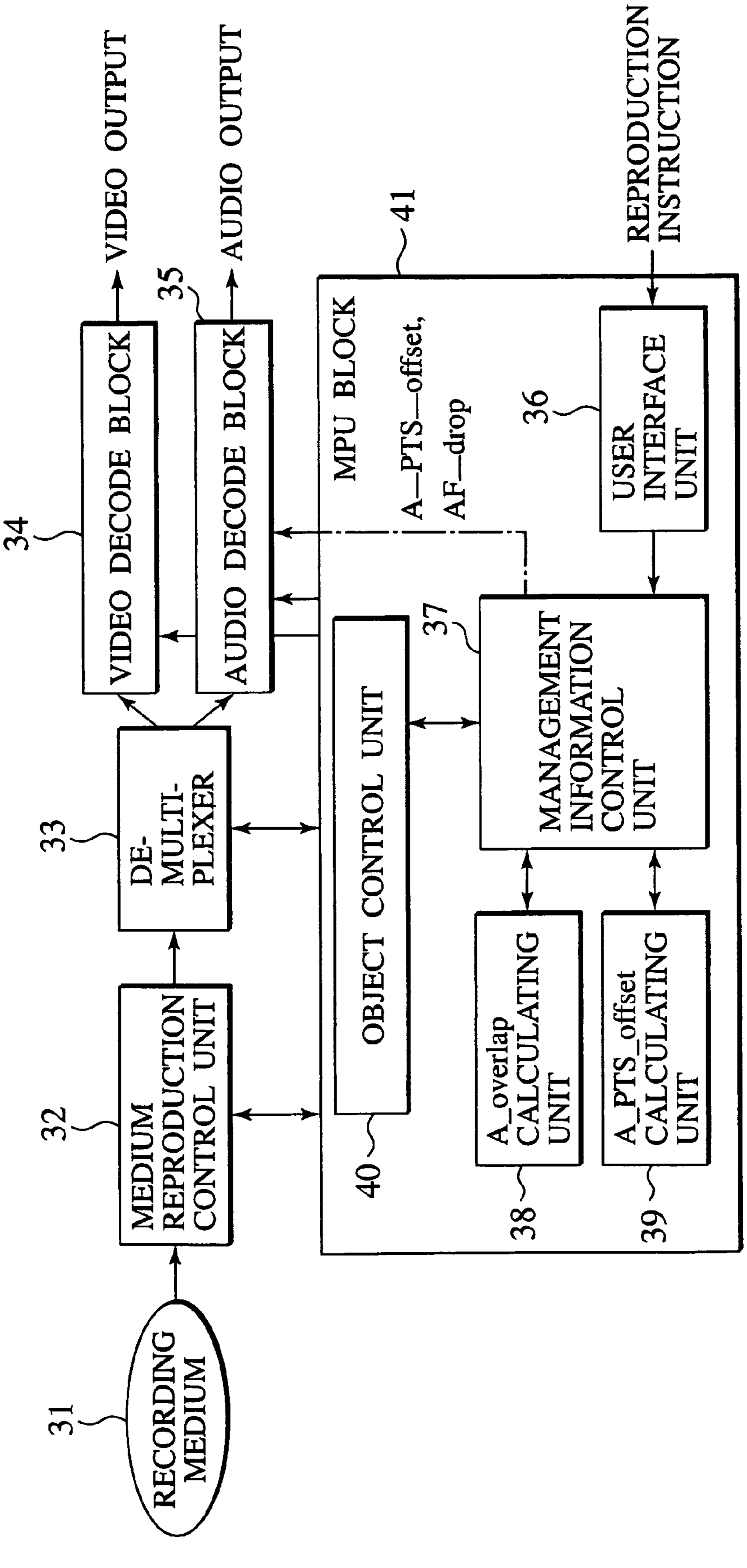
FIG. 11 is a block diagram showing Example I of the audio/video recording apparatus of the invention.

Example I of the audio/video reproducing apparatus of the invention will now be described. FIG. 11 is a block diagram showing Example I of the audio/video reproducing apparatus of the invention.

In FIG. 11, the VOBs edited and recorded by the recording apparatus shown in FIG. 9 are recorded on a recording medium 31. A user interface unit 36, a management information control unit 37, an A_overlap calculating unit 38, an A_PTS_offset calculating unit 39, and an object control unit 40 construct an MPU block 41.

In the reproducing apparatus, first, a reproduction instruction is received by the management information control unit 37 via the user interface unit 36. By the reproduction instruction, generally, a reproduction sequence to be reproduced is designated. It is assumed that information of connecting and reproducing a plurality of VOBs is recorded in the reproduction sequence. A basic procedure of reproducing VOB data will be described below.

Information related to reproduction of VOBs recorded in the reproduction sequence is determined by the management information control unit 37, and VOB data is read from the recording medium 31 via the object control unit 40 and a medium reproduction control unit 32. It is assumed that the management information such as an edition point has been already read from the recording medium 31 via the medium reproduction control unit 32 and is always stored in a (not shown) memory in the MPU block 40.

The read VOB data is supplied from the medium reproduction control unit 32 to a demultiplexer 33 where it is demultiplexed into video data and audio data. The video data is supplied to a video decode block 34. The audio data is supplied to an audio decode block 35 having a configuration shown as the decode side in FIG. 7(A). The video data is decoded according to a video PTS accompanying the video data and becomes a video frame. The audio data is decoded according to an offset PTS. When AF_drop=1, the final audio frame in the VOB is not reproduced.

At this time, clock information such as SCR is decoded by the demultiplexer 33 and, as necessary, passed to the MPU block 40. The clock information such as STC is passed from the MPU block 40 to the demultiplexer 33, video decode block 34, and audio decode block 35. A reproduction timing is controlled synchronously with the STC.

Reproduction of audio will be described in detail hereinbelow. In the embodiment, overlap time A_overlap between an audio frame to be reproduced last in a video object before the connection point and an audio frame to be reproduced first in a video object after the connection point and A_PTS_offset indicative of an offset amount for reproduction to offset an audio frame group of the following VOB so as to set A_overlap to zero are not recorded on the recording medium 31. Consequently, they are calculated on the reproduction side and used.

Specifically, the A_overlap calculating unit 38 calculates the overlap time A_overlap by substituting information at the edition point obtained from the information of the reproduction sequence input to the management information control unit 37 into Equation 5. The A_PTS_offset calculating unit 39 receives A_overlap at the connection point calculated by the A_overlap calculating unit 38 via the management information control unit 37 and calculates A_PTS_offset.

The A_PTS_offset calculating unit 39 calculates A_PTS_offset by the arithmetic expression of Equation 8 on the basis of the input A_overlap, further calculates AF_drop on the basis of the conditional equation of Equation 9, and supplies them to the management information control unit 37. The management information control unit 37 supplies the input A_PTS_offset and AF_drop to the audio decode block 35, offsets the audio frame reproduction timing only by the amount of A_PTS_offset, and performs reproduction. When AF_drop=1, the management information control unit 37 performs control so as not to reproduce the final audio frame.

<Example I of Audio/Video Reproducing Method>

Next, Example I of the audio/video reproducing method of the invention will be described with reference to the flowchart of FIG. 12.

First, a sequence to be reproduced is determined and information of VOBs included in the sequence is checked (step S11). Subsequently, A_overlap at the connection point is calculated by the A_overlap calculating unit 38 and, further, on the basis of A_overlap, A_PTS_offset (and AF_drop) is calculated by the A_PTS_offset calculating unit 39 (step S12).

Subsequently, on or just before start of reproduction of VOBs, to enable seamless connection, the STC is reset and A_PTS_offset (and AF_drop) calculated by the A_PTS_offset calculating unit 39 is set into the audio decode block 35 (step S13).

After that, the VOB data is actually read from the recording medium 31, the video data is supplied to the video decode block 34 via the medium reproduction control unit 32 and the demultiplexer 33, and the audio data is supplied to the audio decode block 35. The video data and the audio data is decoded, thereby reproducing the video frame and the audio frame (step S14). When AF_drop=1, the final audio frame in the VOB is processed so as not to be reproduced (step S15).

The audio frame reproduced in such a manner is subjected to encoding including the window function process and the orthogonal inverse transformation process by the decoder shown in FIG. 7(A) in the audio decode block 35, and the resultant is output as an audio signal. Subsequently, whether the process is performed on all of VOBs in the reproduction sequence or not is determined (step S16). If the VOB is the final one, the reproduction is finished (step S17).

Figure 12:
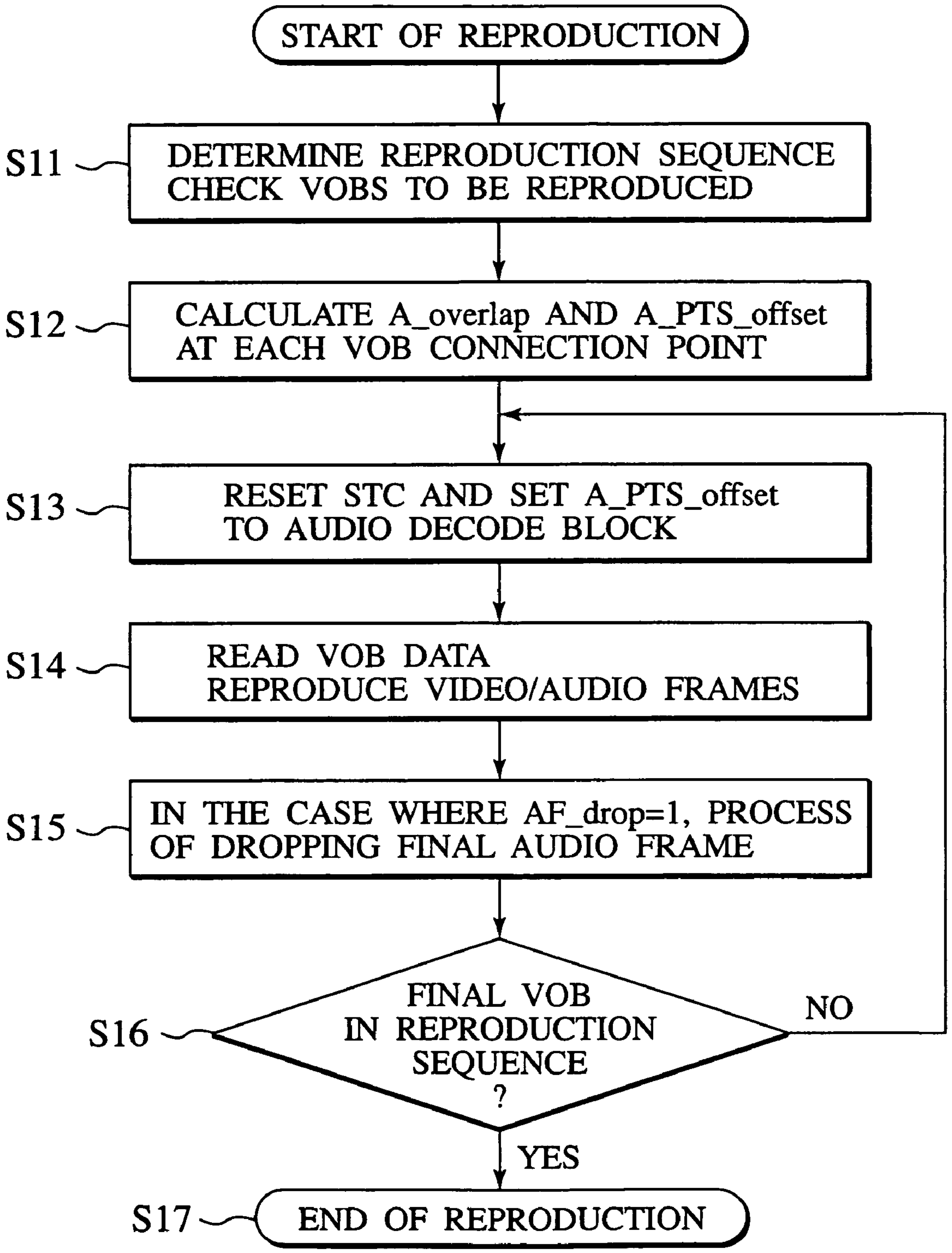
FIG. 12 is a flowchart of Example I of the audio/video recording method of the invention.

It should be noted that the reproducing method shown in FIG. 12 can be executed by the reproducing apparatus as illustrated in FIG. 11 and also by a program on a computer having the function of reproducing the recording medium.

In such a manner, according to the embodiment, in addition to the seamless connection of video frames, audio frames can be also seamlessly connected without noise caused by discontinuity at a connection point.

Next, an audio buffer (not shown) included in the audio decode block 35 in the reproducing apparatus of FIG. 11 will be described. Generally, a necessary amount of the audio buffer is determined by the type of the audio encoding, the bit rate at the time of operation, and the like. In the first embodiment of the invention, data transfer from the audio buffer to the audio decoder is delayed by one audio frame period at the maximum. Therefore, the amount of the audio buffer necessary for the invention is obtained by adding the data amount of one audio frame to the audio buffer amount in the case where "A_PTS_offset=0" and the invention is not applied.

Therefore, in the case of providing the upper limit in the audio buffer size, audio data is multiplexed by using, as the upper limit, a buffer occupation amount obtained by subtracting the data amount of one audio frame from the upper limit of the audio buffer size at the time of recording VOBs including an audio stream. In such a manner, even in the case where reproduction is performed with delay of one audio frame period at the maximum at the time of reproduction, the audio buffer can be prevented from overflowing. In this case, by recording a flag (an audio_mux_status flag) indicating that multiplexing is performed in a state where the audio buffer occupation amount does not exceed "the upper limit of the audio buffer size—the data amount of one audio frame" on a disc, it can be used as an index in the case of constructing audio seamless connection of the invention.

Figure 13:
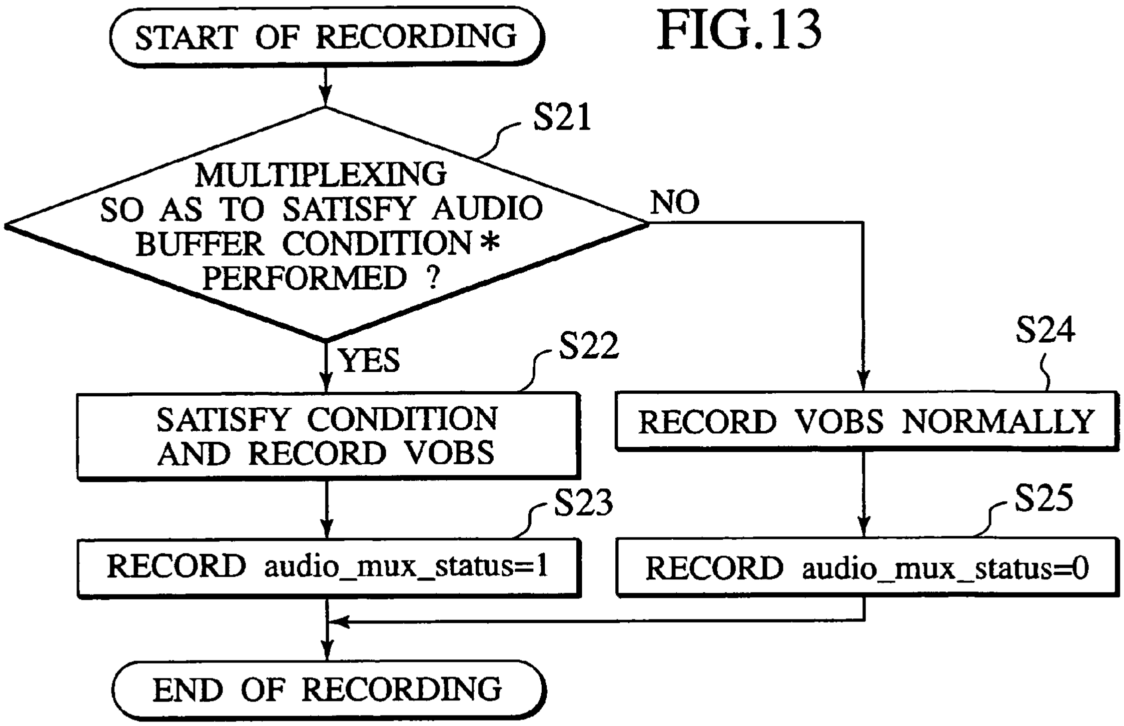
FIG. 13 is a flowchart showing an embodiment of a recording method of the invention in the case where an audio buffer occupation amount is considered.

FIG. 13 shows a flowchart of an example of the audio/video recording method of the invention in the case of recording VOBs in consideration of the audio_mux_status flag. It is defined here that audio_mux_status=1 in the case where multiplexing is performed so that the audio buffer size occupation amount is equal to or smaller than "audio buffer size upper limit—the data amount of one audio frame", and audio_mux_status=0 in the other case.

The recording method will be described below with reference to FIGS. 13 and 9. First, the management information control unit 26 in the MPU block 22 determines whether or not multiplexing is performed so as to satisfy the audio buffer condition (predetermined audio multiplex state) (step S21 in FIG. 13). At this time, an instruction of the user is received via the user interface unit 25 as necessary.

In the case of satisfying the condition, according to an instruction from the object control unit 27 which received a notification that the condition is to be satisfied from the management information control unit 26, the video/audio encode block 24 multiplexes the audio data and the video data so that the audio buffer occupation amount is equal to or smaller than the value obtained by subtracting the data amount of one audio frame from the specified upper limit of the audio buffer, and records VOBs obtained by the multiplexing onto the recording medium 21 via the medium recording control unit 23 (step S22 in FIG. 13). The management information control unit 26 sets the audio_mux_status flag indicative of the audio multiplex state to 1 and records the flag together with other management information onto the recording medium 21 via the medium recording control unit 23 (step S23 in FIG. 13).

On the other hand, in the case where the management information control unit 26 determines that the audio buffer condition is not satisfied (or it is not assured to satisfy the condition) in step S21, according to an instruction from the object control unit 27 which has received the notification that the condition is not to be satisfied from the management information control unit 26, VOBs obtained under the normal audio buffer condition in the video/audio encode block 24 are recorded onto the recording medium 21 via the medium recording control unit 23 (step S24 in FIG. 13). The audio_mux_status flag whose value is set to 0, which is generated together with the other management information by the management information control unit 26 is recorded onto the recording medium 21 via the medium recording control unit 23 (step S25 in FIG. 13).

Figure 14:
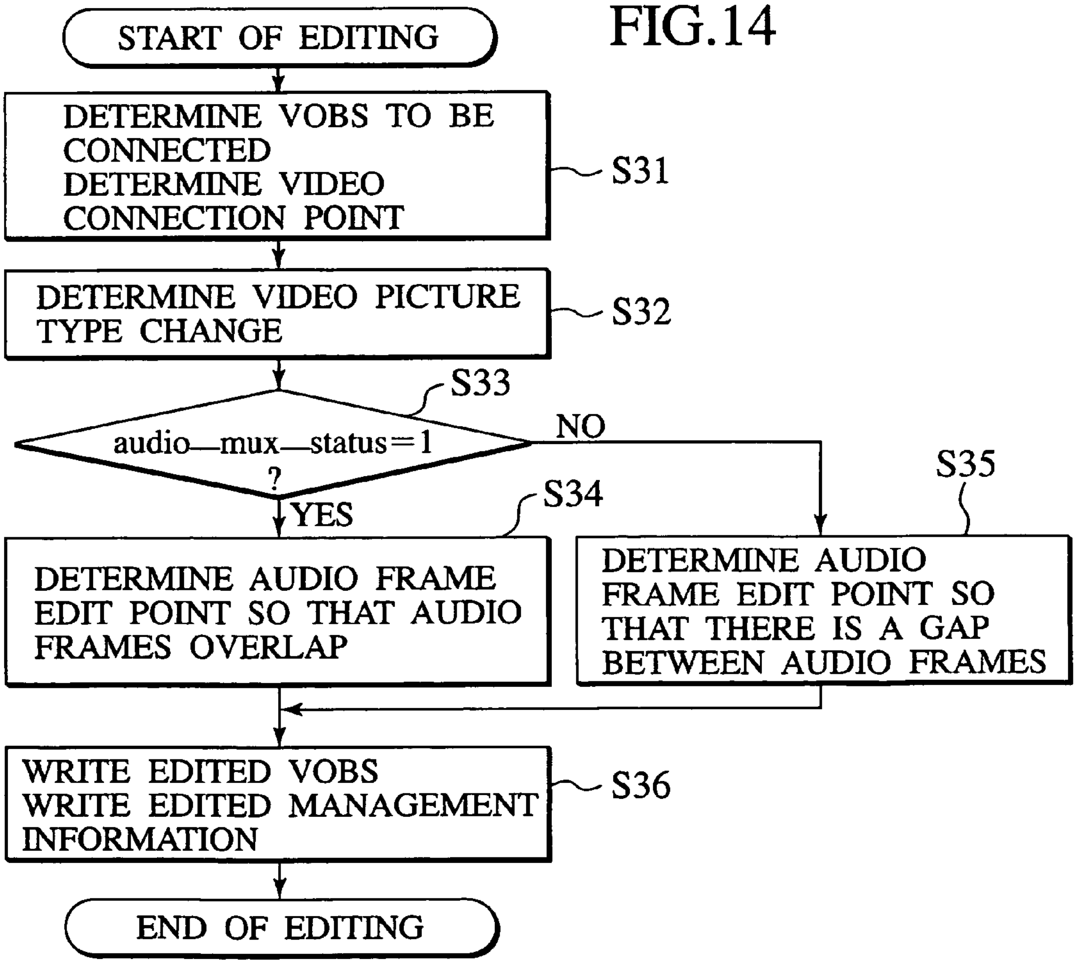
FIG. 14 is a flowchart showing an embodiment of an editing method of the invention in the case where the audio buffer occupation amount is considered.

FIG. 14 shows a flowchart of an example of the audio/video editing method of the invention in the case of editing VOBs in consideration of the audio_mux_status flag. Like FIG. 10, in the management information control unit 26 in FIG. 9, VOBs to be connected are determined, and a video connection point (a connection point between a video frame to be reproduced last in the VOB before the connection point and a video frame to be reproduced first in the VOB after the connection point) is determined (step S31 in FIG. 14). Subsequently, whether the video picture type changing process is necessary or not is determined in correspondence with the video connection point and, if necessary, a change is concretely prepared (step S32 in FIG. 14).

Next, after the video connection point is determined, the management information control unit 26 checks whether the value of the audio_mux_status flag related to the VOBs to be connected in the management information read from the recording medium 21 via the medium recording control unit 23 in FIG. 9 is 1 or not (step S33 in FIG. 14). In the case where the value of the audio_mux_status flag is 1, the audio frame edition point is determined so that audio frames overlap in accordance with the invention (step S34 in FIG. 14). In the case where the value of the audio_mux_status flag is 0, the audio frame edition point is determined so that a gap is created between audio frames like the conventional technique (step S35 in FIG. 14).

After the process of step S34 or S35, the edited VOBs (data around the connection point) are written onto the recording medium 21 via the object control unit 27 and the medium recording control unit 23 and information of the edition point is also written as management information onto the recording medium 21 (step S36 in FIG. 14).

In the first embodiment, the recording location of the edited data (video data and audio data) is not limited in the invention as long as seamless reproduction can be assured when a seek condition depending on a recording medium used or a reproducing apparatus as a precondition or the like is considered. That is, in the case where edition data is constructed substantially with overlap between audio frames and can be reproduced with an audio PTS offset irrespective of the data recording location, the gist of the invention is satisfied.

<Connection Edition and Video/Audio Reproduction of Second Embodiment>

Next, a second embodiment of the invention will be described mainly with respect to points different from the first embodiment. In the first embodiment whose concept on connection edition and video/audio is shown in FIG. 8, the value of A_PTS_offset is always zero or larger (time delay). In contrast, in the second embodiment shown in FIG. 15, the value of A_PTS_offset is also allowed to become negative (time advance). In other words, in the first embodiment, basically, $0 \leqq \text{A\_PTS\_offset} < T_A$ is satisfied. In the second embodiment, basically, $-0.5 \times T_A < \text{A\_PTS\_offset} \leqq 0.5 \times T_A$ (or $-0.5 \times T_A \leqq \text{A\_PTS\_offset} < 0.5 \times T_A$) is satisfied.

Also in the second embodiment, Equations 4 to 8 can be applied as they are. However, Equation 9 is replaced with the following equation to specify the range of the value of A_PTS_offset.

$$\begin{aligned} &\text{If}(\text{A\_PTS\_offset}^k > 0.5 \times T_A)\{ \\ &\quad \text{A\_PTS\_offset}^k = \text{A\_PTS\_offset}^k - T_A; \\ &\quad \text{AF\_drop}^{k-1} = 1; \\ &\} \text{ else } \text{AF\_drop}^{k-1} = 0 \end{aligned} \quad \text{Equation 10}$$

Calculation in FIG. 15 will be further explained. At the first connection point in FIG. 15, first, $\text{A\_PTS\_offset}^2 = \text{A\_overlap}^2$ of Equation 6 is satisfied. In this example, $\text{A\_PTS\_offset}^2$ is larger than $0.5 \times T_A$, so that the If sentence in Equation 10 becomes true, and $\text{A\_PTS\_offset}^2$ becomes a negative value (the offset becomes time advance). Simultaneously, $\text{AF\_drop}^1$ becomes 1. That is, the final audio frame in VOB1 is dropped from reproduction. FIG. 15 shows a state after drop.

Next, at the second connection point in FIG. 15, $\text{A\_PTS\_offset}^3$ is calculated as the sum of $\text{A\_overlap}^3$ and $\text{A\_PTS\_offset}^2$ by Equation 7. In this example, $\text{A\_PTS\_offset}^2$ is a negative value, so that $\text{A\_PTS\_offset}^3$ is a value smaller than $\text{A\_overlap}^3$. Since $\text{A\_PTS\_offset}^3$ is smaller than $0.5 \times T_A$, the If sentence in Equation 10 becomes false, and $\text{A\_PTS\_offset}^3$ becomes a positive value (the offset becomes time delay). Simultaneously, AF_drop[2] becomes zero.

The other configuration of the second embodiment is the same as that of the first embodiment. That is, in a manner similar to the recording/editing apparatus and method and reproducing apparatus and method shown in FIGS. 9, 10, 11, and 12, A_overlap is calculated at each VOB connection point upon reproduction. Further, based on A_overlap, A_PTS_offset (and AF_drop) is calculated. The calculated A_PTS_offset (and AF_drop) is supplied to the audio decode block 35, and a control is executed to perform reproduction by offsetting the timing of reproducing an audio frame only by the amount of A_PTS_offset. In the case where AF_drop=1, a control is executed so as not to reproduce the final audio frame of the VOB.

Also in the second embodiment as described above, in a manner similar to the first embodiment, in addition to seamless connection of video frames, audio frames can be also seamlessly connected without noise caused by discontinuity at a connection point. Also in the second embodiment, in a manner similar to the first embodiment, the editing method and the reproducing method can be executed as a program on a computer.

Next, an audio buffer (not shown) included in the audio decode block 35 in the reproducing apparatus of FIG. 11 will be described. Generally, a necessary amount of the audio buffer is determined by the type of audio encoding, a bit rate at the time of operation, and the like. In the first embodiment of the invention, transfer of data from the audio buffer to the audio decoder is delayed by one audio frame period at the maximum. Therefore, the amount of the audio buffer necessary for the invention is an amount obtained by adding the data amount of one audio frame to the audio buffer amount of the case of “A_PTS_offset=0” to which the invention is not applied.

On the other hand, also in the case of the second embodiment, when a delay of a 0.5 audio frame period at the maximum is considered, the necessary amount of the audio buffer becomes the amount obtained by adding the data amount of one audio frame to the audio buffer amount of the case of “A_PTS_offset=0” to which the invention is not applied. Further, in the case of the second embodiment, in consideration of the fact that data transfer from the audio buffer to the audio decoder is performed earlier by the 0.5 audio frame period at the maximum, multiplexing which makes the audio buffer occupation amount upon reproduction always be one audio frame data amount or larger has to be performed at the time of generation of VOBs.

Therefore, in the case of providing the upper limit in the audio buffer size, by multiplexing audio data by using a buffer occupation amount obtained by subtracting the data amount of one audio frame from the upper limit of the audio buffer size as an upper limit at the time of recording of VOBs including an audio stream, even in the case where reproduction is performed with a delay of a 0.5 audio frame period at the maximum, an overflow in the audio buffer does not occur. In this case, if a flag (for example, an audio_mux_status flag) indicating that multiplexing is performed with an audio buffer occupation amount which does not exceed “audio buffer size upper limit—data amount of one audio frame” is recorded on a disc, it can be used as an index in the case of constructing audio seamless connection of the invention.

Further, in the case of the second embodiment, if a flag indicating that multiplexing is performed so that the audio buffer occupation amount becomes always equal to or larger than a data amount of one audio frame is prepared, the flag can be used as an index in the case of constructing audio seamless connection according to the embodiment. The flag and the above-described audio_mux_status flag may be different from each other or the same. Also in the case of the second embodiment, recording and editing can be performed by the same processing steps as those in FIGS. 13 and 14 except that a condition that the audio buffer occupation amount is always equal to or larger than a data amount of one audio frame is added to the audio buffer condition.

The recording location of the edited data (video data and audio data) is not limited in the invention as long as seamless reproduction can be assured when a seek condition depending on a recording medium used or a reproducing apparatus as a precondition or the like is considered. That is, in the case where edition data is constructed substantially with overlap between audio frames and can be reproduced with an audio PTS offset irrespective of the data recording location, the gist of the invention is satisfied.

<Other Examples of Audio/Video Recording/Reproduction>

Other examples of the foregoing audio/video recording apparatus/method and reproducing apparatus/method of the invention will now be described.

<Example II of Audio/Video Recording Apparatus>

Figure 16:
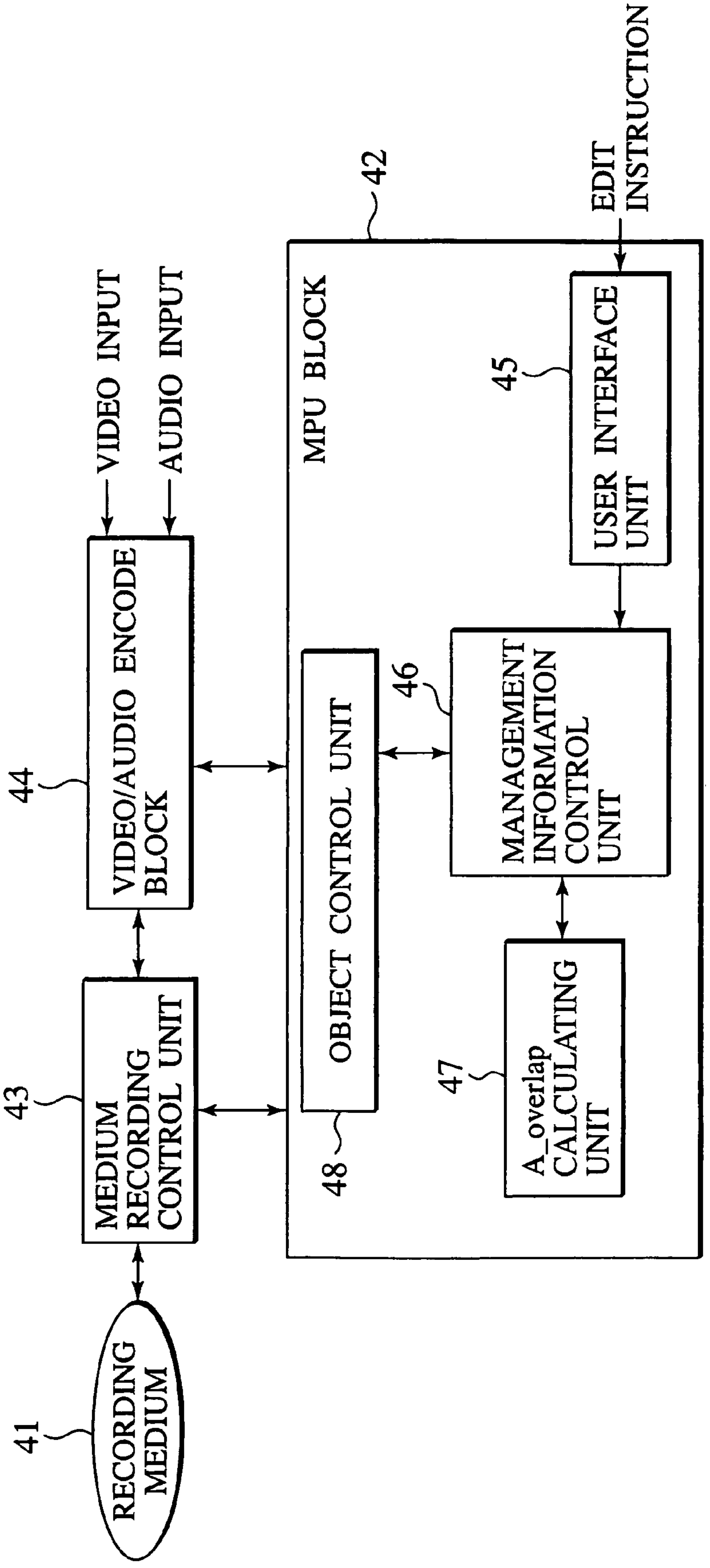
FIG. 16 is a block diagram showing Example II of the audio/video recording apparatus of the invention.

FIG. 16 is a block diagram showing Example II of the audio/video recording apparatus of the invention. It is assumed that recording of a plurality of VOBs is finished, and connection edition operations will be described here.

In FIG. 16, a user interface unit 45, a management information control unit 46, an A_overlap calculating unit 47, and an object control unit 48 construct an MPU block 42 and are realized by a software process of an MPU (Micro Processing Unit).

First, an edit instruction is given from the user via the user interface unit 45. The management information control unit 46 recognizes a connection edition point by using corresponding management information. At this time, first, the edition point of an audio frame is determined, as described above, so that overlap of audio frames exists at the connection point. Next, with respect to video frames, a picture type converting process is performed as necessary. The process is performed via the object control unit 48, a video/audio encode block 44, and a medium recording control unit 43 and the resultant is written to the recording medium 41.

<Example II of Audio/Video Recording Method>

Next, calculation and recording for audio seamless connection is performed. Calculation and recording for audio seamless connection of Example II of the audio/video recording method of the invention will be described with reference to the flowchart of FIG. 17.

First, in the management information control unit 46, VOBs to be connected are determined and a video connection point (connection point between a video frame to be reproduced last in a VOB and a video frame to be reproduced first in the following VOB) is determined (step S41). Next, whether the video picture type changing process is necessary or not is determined in accordance with the video connection point. If it is necessary, concrete preparation for the change is made (step S42).

Next, in correspondence with the video connection point, an audio frame edit point is determined (step S43). Specifically, the audio frame edit point is determined so that the period of reproducing an audio frame to be reproduced last of a VOB includes time of the video connection point, and the period of reproducing an audio frame to be reproduced first of the following VOB includes the time of the video connection point.

Subsequently, the A_overlap calculating unit 47 calculates the above-described A_overlap (step S44). Finally, the edited VOBs (data around the connection point), the calculated A_overlap, and the management information such as the reproduction sequence are written onto the recording medium 41 via the object control unit 48 and the medium recording control unit 43 (step S45). The reproduction sequence includes information of the VOBs to be reproduced and information of the connection point. The audio encode block in the video/audio encode block 44 has the configuration on the encode side of FIG. 7(A).

Figure 17:
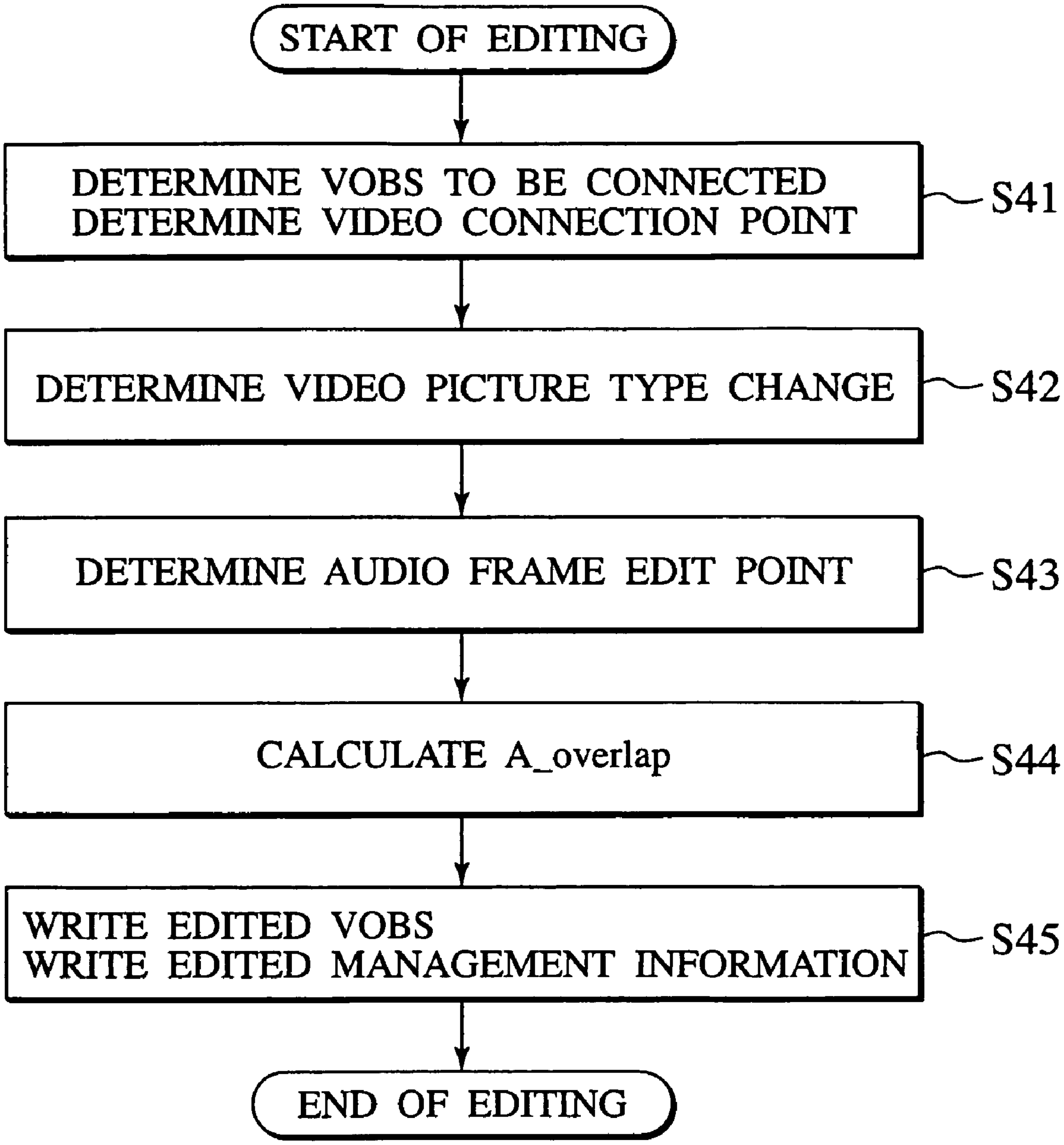
FIG. 17 is a flowchart of Example II of the audio/video recording method of the invention.

It is to be noted that the recording method described by referring to FIG. 17 can be carried out by a dedicated apparatus as illustrated in FIG. 16 and also as a program on a computer having a recording function of the recording medium.

<Example II of Audio/Video Reproducing Apparatus>

Figure 18:
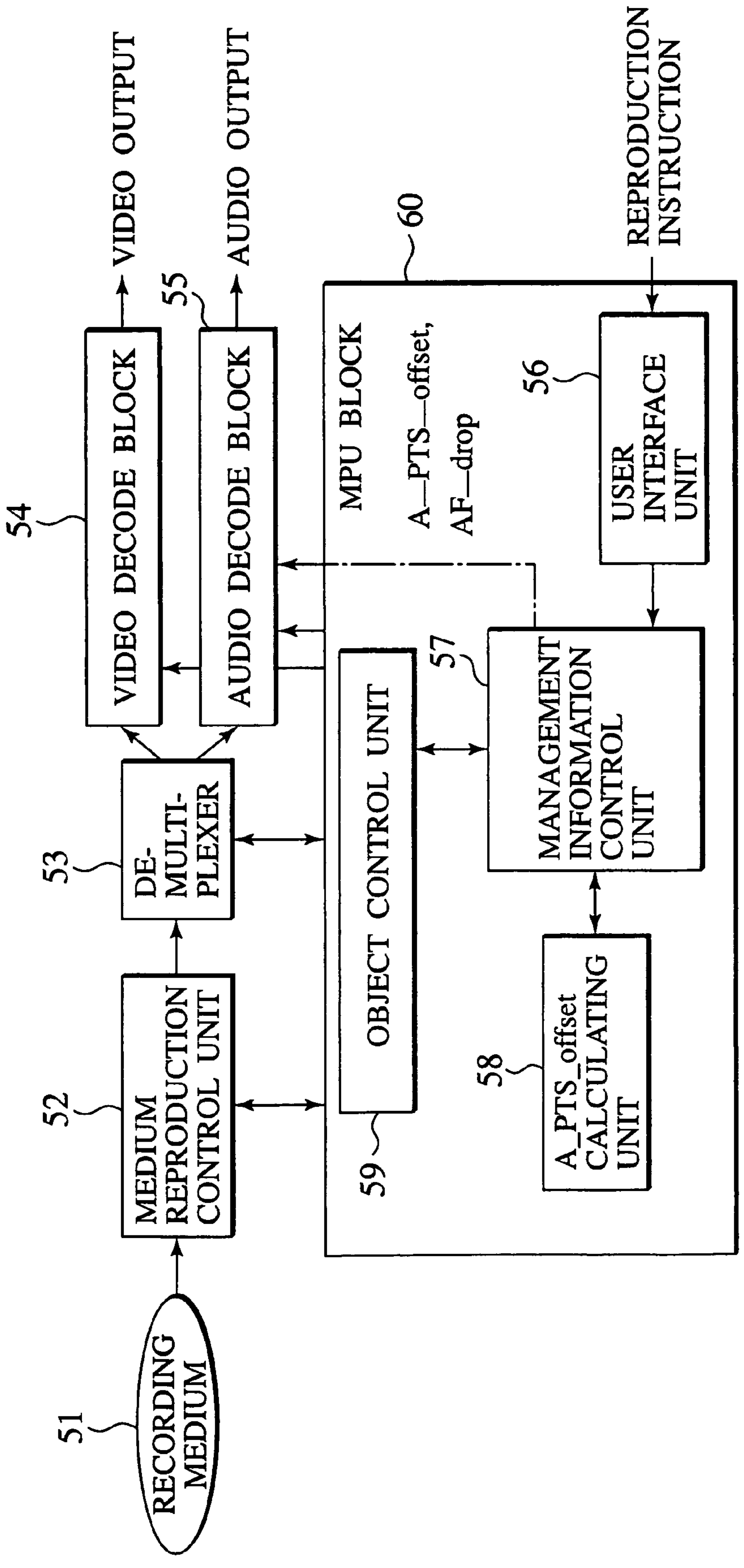
FIG. 18 is a block diagram showing Example II of the audio/video reproducing apparatus of the invention.

Example II of the audio/video reproducing apparatus of the invention will now be described. FIG. 18 is a block diagram showing Example II of the audio/video reproducing apparatus of the invention.

In FIG. 18, the VOBs edited and recorded by the recording apparatus shown in FIG. 16 are recorded on a recording medium 51. A user interface unit 56, a management information control unit 57, an A_PTS_offset calculating unit 58, and an object control unit 59 construct an MPU block 60.

In the reproducing apparatus, first, a reproduction instruction is received by the management information control unit 57 via the user interface unit 56. By the reproduction instruction, generally, a reproduction sequence to be reproduced is designated. It is assumed that information of connecting and reproducing a plurality of VOBs is recorded in the reproduction sequence. A basic procedure of reproducing VOB data will be described below.

Information related to reproduction of VOBs recorded in the reproduction sequence is determined by the management information control unit 57, and VOB data is read from the recording medium 51 via the object control unit 59 and a medium reproduction control unit 52. It is assumed that the management information such as a reproduction sequence has been already read from the recording medium 51 via the medium reproduction control unit 52 and is always stored in a (not shown) memory in the MPU block 60.

The read VOB data is supplied from the medium reproduction control unit 52 to a demultiplexer 53 where it is demultiplexed into video data and audio data. The video data is supplied to a video decode block 54. The audio data is supplied to an audio decode block 55 having a configuration shown as the decode side in FIG. 7(A). The video and audio data is decoded and output as a decoded video frame and a decoded audio frame. At this time, clock information such as SCR is decoded by the demultiplexer 53 and, as necessary, passed to the MPU block 60. The clock information such as STC is passed from the MPU block 60 to the demultiplexer 53, video decode block 54, and audio decode block 55. A reproduction timing is controlled synchronously with the STC.

Reproduction of audio will be described in detail hereinbelow. In the embodiment, management information including A_overlap at a connection point is recorded on the recording medium 51. The management information read from the recording medium 51 by the medium reproduction control unit 52 is supplied to the management information control unit 57 via the object control unit 59 where A_overlap at the connection point is extracted from the management information and supplied to the A_PTS_offset calculating unit 58.

The A_PTS_offset calculating unit 58 calculates A_PTS_offset by the arithmetic expression of Equation 8 on the basis of the input A_overlap, further calculates AF_drop on the basis of the conditional equation of Equation 9, and supplies them to the management information control unit 57. The management information control unit 57 supplies the input A_PTS_offset and AF_drop to the audio decode block 55, offsets the audio frame reproduction timing only by the amount of A_PTS_offset, and performs reproduction. When AF_drop=1, the management information control unit 57 performs control so as not to reproduce the final audio frame of the VOB.

<Example II of Audio/Video Reproducing Method>

Next, Example II of the audio/video reproducing method of the invention will be described with reference to the flowchart of FIG. 19.

First, a sequence to be reproduced is determined and information of VOBs included in the sequence is checked (step S51). Subsequently, on the basis of the reproduced A_overlap, A_PTS_offset (and AF_drop) is calculated by the A_PTS_offset calculating unit 58 at each of VOB connection points (step S52).

Subsequently, on or just before start of reproduction of VOBs, to enable seamless connection, the STC is reset and A_PTS_offset (and AF_drop) calculated by the A_PTS_offset calculating unit 58 is set into the audio decode block 55 (step S53).

After that, the VOB data is actually read from the recording medium 51, the video data is supplied to the video decode block 54 via the medium reproduction control unit 52 and the demultiplexer 53, and the audio data is supplied to the audio decode block 55. The video data and the audio data is decoded, thereby reproducing the video frame and the audio frame (step S54). When AF_drop=1, the final audio frame in the VOB is processed so as not to be reproduced (step S55).

The audio frame reproduced in such a manner is subjected to encoding including the window function multiplying process and the orthogonal inverse transformation process by the decoder shown in FIG. 7(A), and the resultant is output as an audio signal. Subsequently, whether the process is performed on all of VOBs in the reproduction sequence or not is determined (step S56). If the VOB is the final one, the reproduction is finished (step S57).

Figure 19:
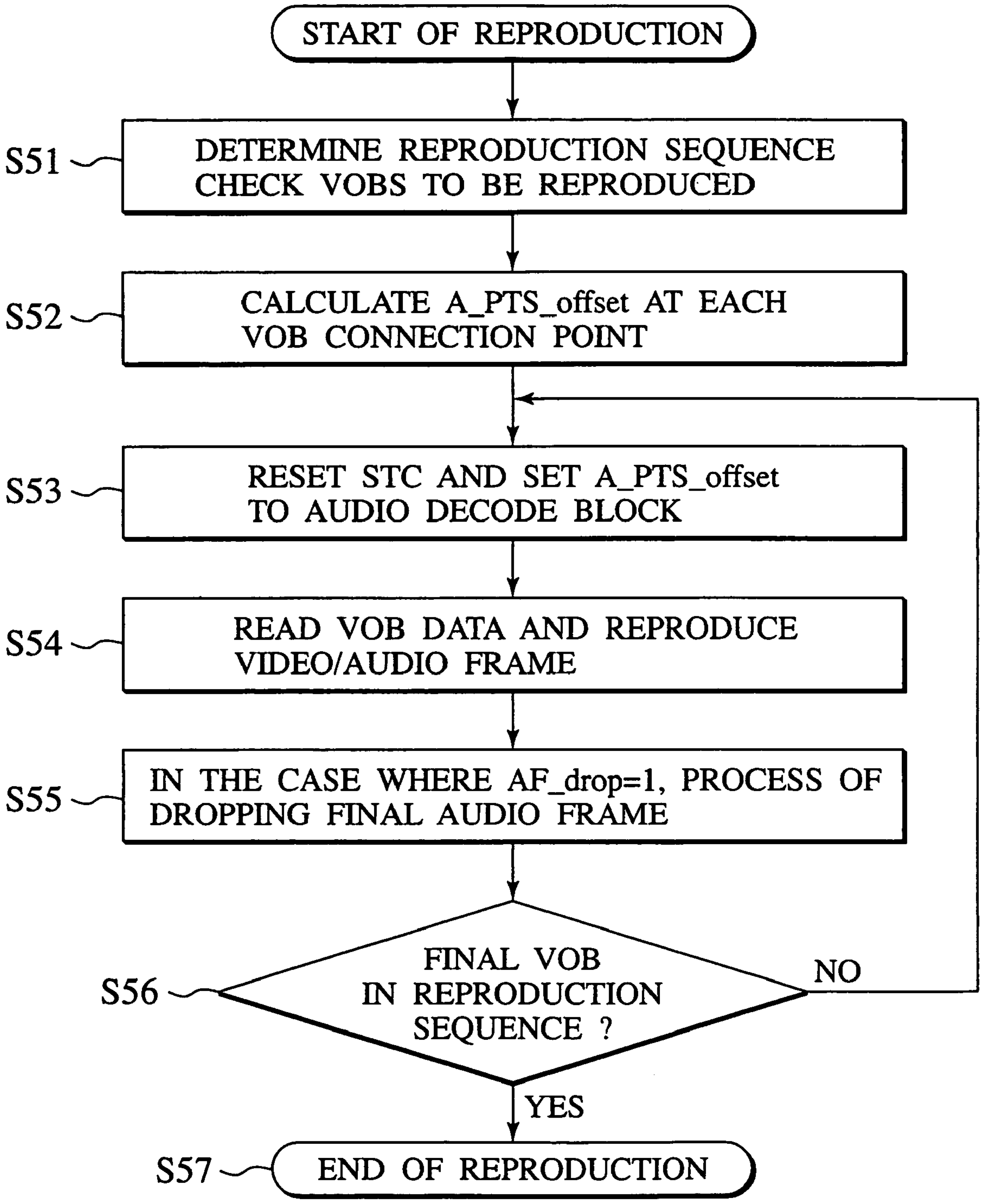
FIG. 19 is a flowchart of Example II of the audio/video recording method of the invention.

It should be noted that the reproducing method shown in FIG. 19 can be executed by the reproducing apparatus as illustrated in FIG. 18 and also by a program on a computer having the function of reproducing the recording medium.

In such a manner, according to the embodiment, in addition to the seamless connection of video frames, audio frames can be also seamlessly connected without noise caused by discontinuity at a connection point.

<Example III of Audio/Video Recording Apparatus>

Figure 20:
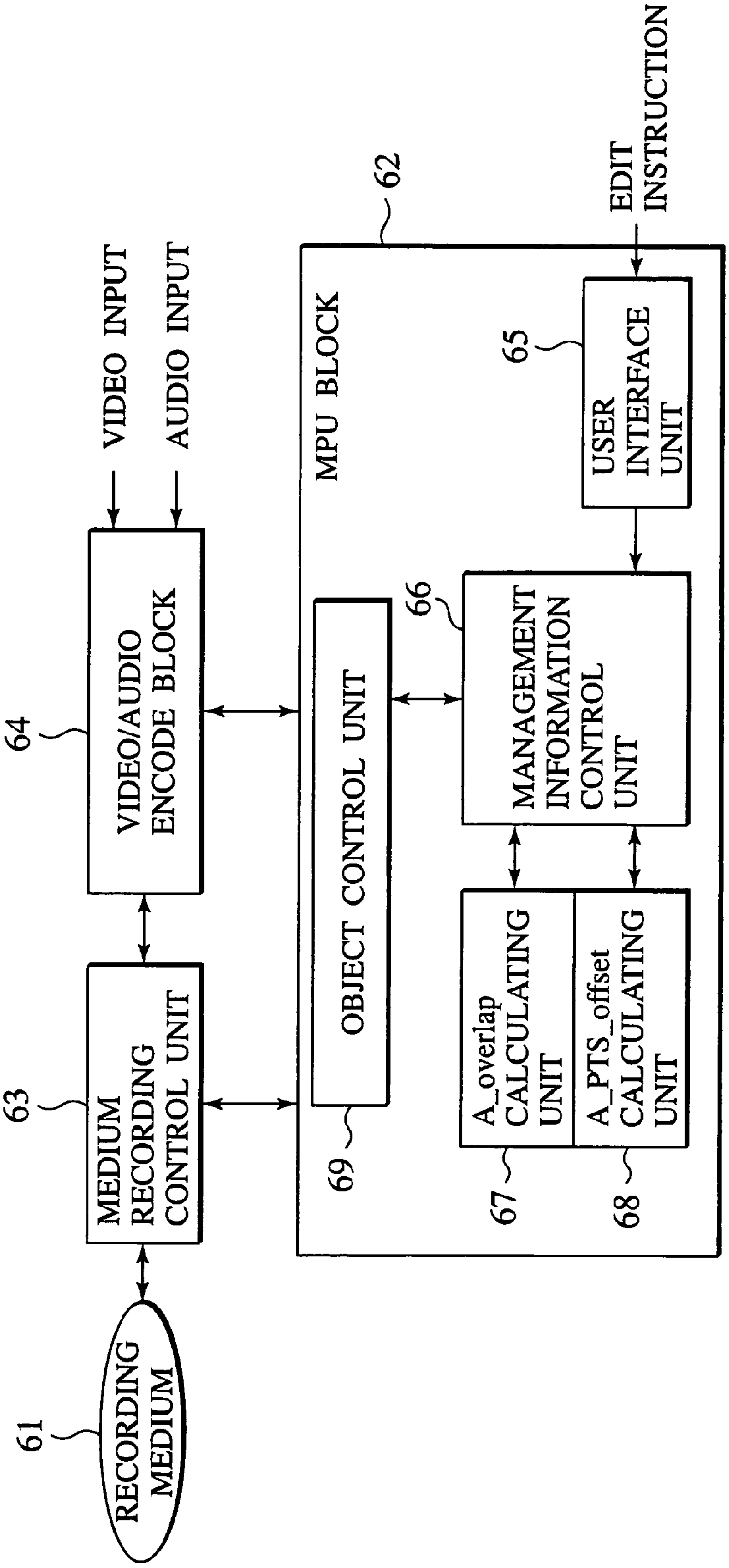
FIG. 20 is a block diagram showing Example III of the audio/video recording apparatus of the invention.

Next, Example III of the audio/video recording apparatus according to the invention will be described. FIG. 20 is a block diagram showing Example III of the audio/video recording apparatus of the invention. It is assumed that recording of a plurality of VOBs is finished, and connection edition operations will be described here.

In FIG. 20, a user interface unit 65, a management information control unit 66, an A_overlap calculating unit 67, an A_PTS_offset calculating unit 68, and an object control unit 69 construct an MPU block 62 and are realized by a software process of an MPU (Micro Processing Unit).

First, an edit instruction is given from the user via the user interface unit 65. The management information control unit 66 recognizes a connection edition point by using corresponding management information. At this time, first, the edition point of an audio frame is determined, as described above, so that overlap of audio frames exists at the connection point. Next, with respect to video frames, a picture type converting process is performed as necessary. The process is performed via the object control unit 69, a video/audio encode block 64, and a medium recording control unit 63 and the resultant is written onto the recording medium 61.

<Example III of Audio/Video Recording Method>

Next, calculation and recording for audio seamless connection is performed. Calculation and recording for audio seamless connection of Example III of the audio/video recording method of the invention will be described with reference to the flowchart of FIG. 21.

First, in the management information control unit 66, VOBs to be connected are determined and a video connection point (connection point between a video frame to be reproduced last in a VOB and a video frame to be reproduced first in the following VOB) is determined (step S61). Next, whether the video picture type changing process is necessary or not is determined in accordance with the video connection point. If it is necessary, concrete preparation for the change is made (step S62).

Next, in correspondence with the video connection point, an audio frame edit point is determined (step S63). Specifically, the audio frame edit point is determined so that the period of reproducing an audio frame to be reproduced last of a VOB includes time of the video connection point, and the period of reproducing an audio frame to be reproduced first of the following VOB includes the time of the video connection point.

Subsequently, the A_overlap calculating unit 67 calculates the above-described A_overlap (step S64), and the A_PTS_offset calculating unit 68 calculates the above-described A_PTS_offset (and AF_drop) (step S65).

Finally, the edited VOBs (data around the connection point), at least the calculated A_PTS_offset (and AF_drop) and management information such as the reproduction sequence are written onto the recording medium 61 via the object control unit 69 and the medium recording control unit 63 (step S66). It is optional to write A_overlap at this time. The reproduction sequence includes information of the VOBs to be reproduced and information of the connection point. The audio encode block in the video/audio encode block 64 has the configuration on the encode side of FIG. 7(A).

Figure 21:
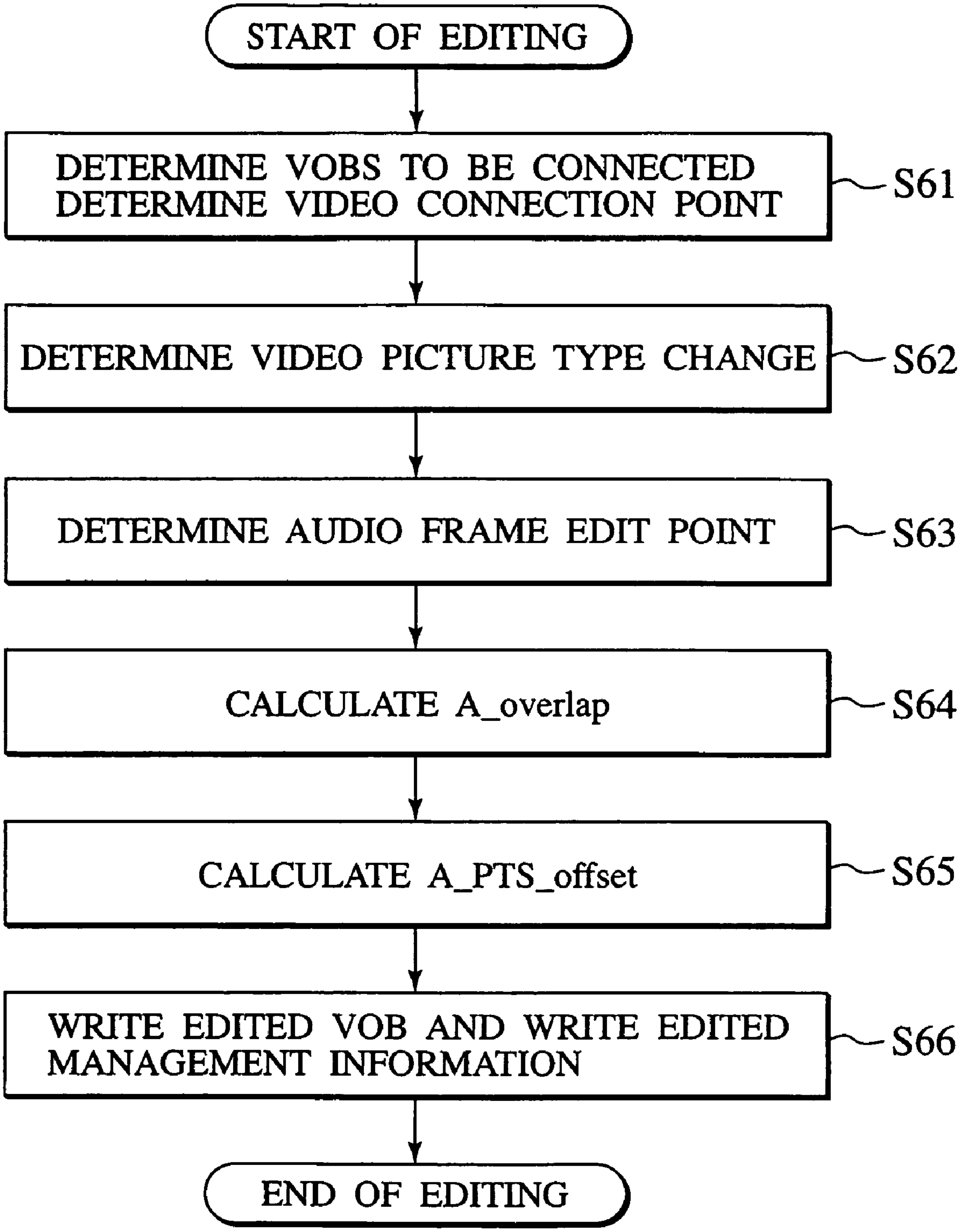
FIG. 21 is a flowchart of Example III of the audio/video recording method of the invention.

It is to be noted that the recording method described by referring to FIG. 21 can be carried out by a dedicated apparatus as illustrated in FIG. 20 and also as a program on a computer having a recording function of the recording medium.

<Example III of Audio/Video Reproducing Apparatus>

Figure 22:
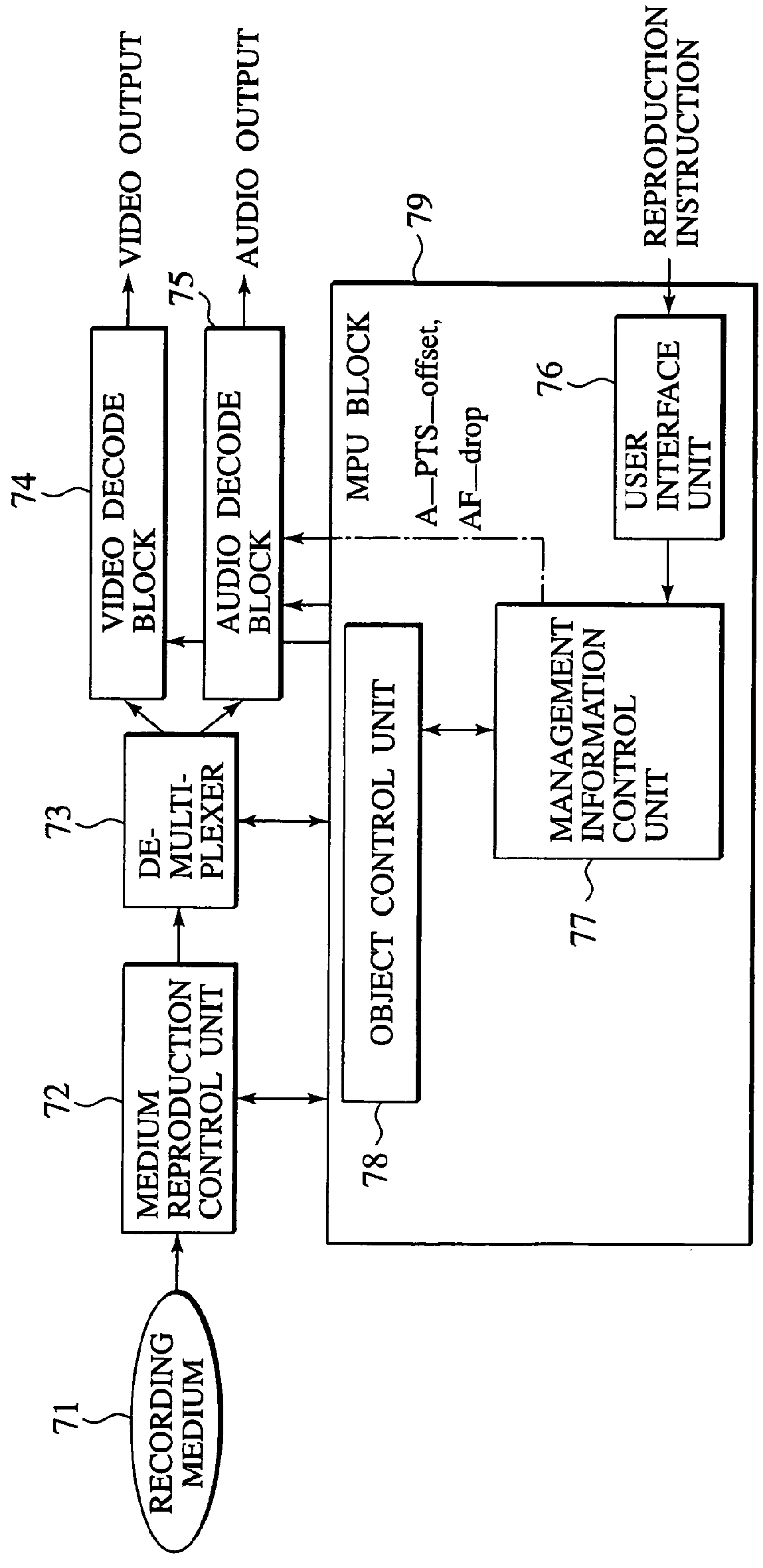
FIG. 22 is a block diagram showing Example III of the audio/video reproducing apparatus of the invention.

Example III of the audio/video reproducing apparatus of the invention will now be described. FIG. 22 is a block diagram showing Example III of the audio/video reproducing apparatus of the invention.

In FIG. 22, the VOBs edited and recorded by the recording apparatus shown in FIG. 20 are recorded on a recording medium 71. A user interface unit 76, a management information control unit 77, and an object control unit 78 construct an MPU block 79.

In the reproducing apparatus, first, a reproduction instruction is received by the management information control unit 77 via the user interface unit 76. By the reproduction instruction, generally, a reproduction sequence to be reproduced is designated. It is assumed that information of connecting and reproducing a plurality of VOBs is recorded in the reproduction sequence. A basic procedure of reproducing VOB data will be described below.

Information related to reproduction of VOBs recorded in the reproduction sequence is determined by the management information control unit 77, and VOB data is read from the recording medium 71 via the object control unit 78 and a medium reproduction control unit 72. It is assumed that the management information such as a reproduction sequence has been already read from the recording medium 71 via the medium reproduction control unit 72 and is always stored in a (not shown) memory in the MPU block 79.

The read VOB data is supplied from the medium reproduction control unit 72 to a demultiplexer 73 where it is demultiplexed into video data and audio data. The video data is supplied to a video decode block 74. The audio data is supplied to an audio decode block 75 having a configuration shown as the decode side in FIG. 7(A). The video and audio data is decoded and output as a decoded video frame and a decoded audio frame. At this time, clock information such as SCR is decoded by the demultiplexer 73 and, as necessary, passed to the MPU block 79. The clock information such as STC is passed from the MPU block 79 to the demultiplexer 73, video decode block 74, and audio decode block 75. A reproduction timing is controlled synchronously with the STC.

Reproduction of audio will be described in detail hereinbelow. In the embodiment, since A_PTS_offset at a connection point is recorded on the recording medium 71, A_PTS_offset (and AF_drop) at the connection point is read from the management information. The obtained A_PTS_offset (and AF_drop) is supplied to the audio decode block 75 and reproduced while the timing of reproducing the audio frame is offset only by the amount of A_PTS_offset. In the case of AF_drop=1, a control is performed so as not to reproduce the last audio frame in the VOB.

<Example III of Audio/Video Reproducing Method>

Next, Example III of the audio/video reproducing method of the invention will be described with reference to the flowchart of FIG. 23.

First, a sequence to be reproduced is determined and information of VOBs included in the sequence is checked (step S71). Subsequently, on or just before start of reproduction of VOBs, to enable seamless connection, the STC is reset and A_PTS_offset reproduced from the recording medium 71 is set into the audio decode block 75 (step S72).

After that, the VOB data is actually read from the recording medium 71, the video data is supplied to the video decode block 74 via the medium reproduction control unit 72 and the demultiplexer 73, and the audio data is supplied to the audio decode block 75. The video data and the audio data is decoded, thereby reproducing the video frame and the audio frame (step S73). When AF_drop=1, the final audio frame in the VOB is processed so as not to be reproduced (step S74). Subsequently, whether the process has been performed on all of the VOBs in the reproduction sequence or not is determined (step S75). If the VOB is the final one, the reproduction is finished (step S76).

Figure 23:
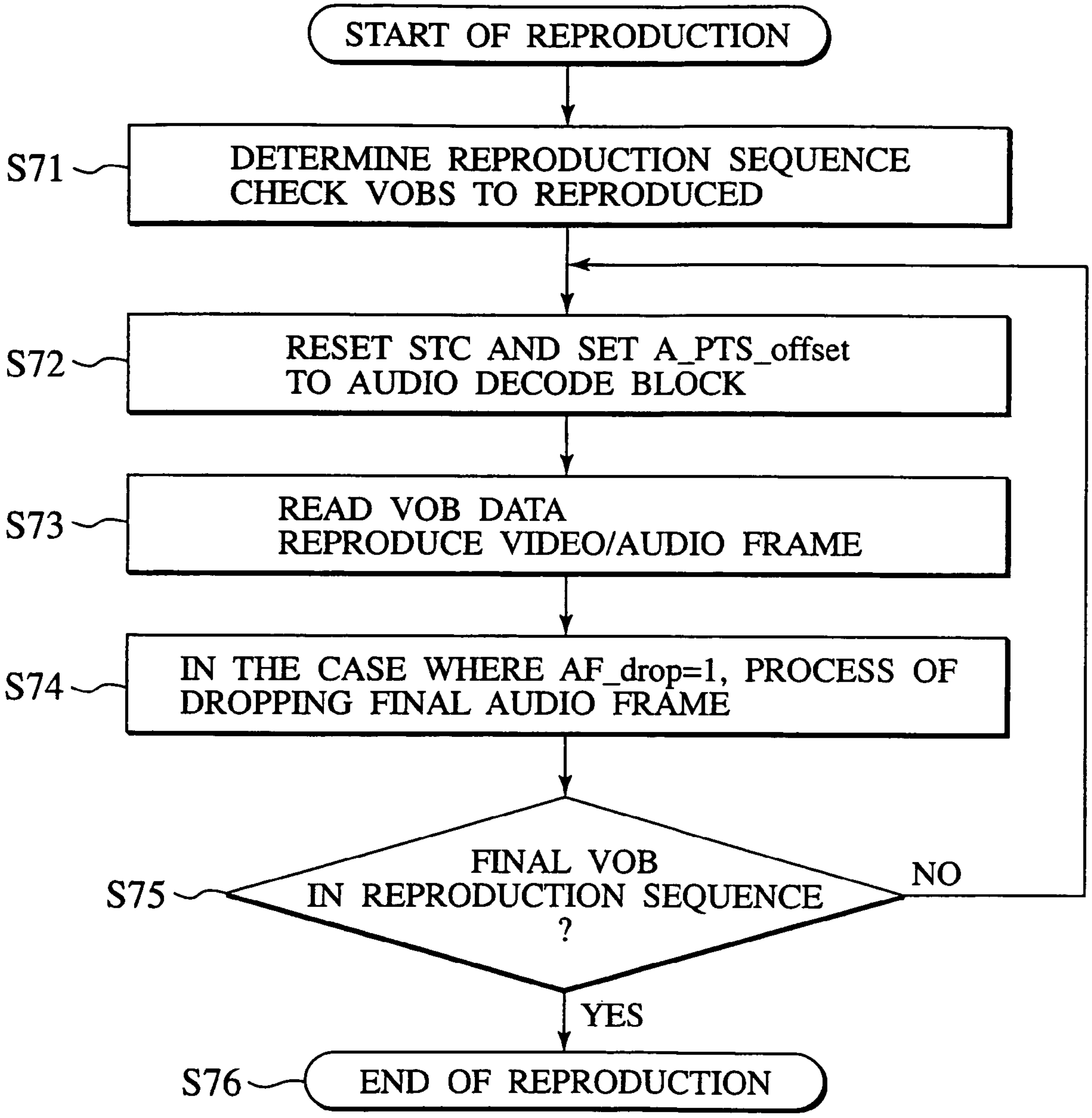
FIG. 23 is a flowchart of Example III of the audio/video reproducing method of the invention.

It should be noted that the reproducing method shown in FIG. 23 can be executed by the reproducing apparatus as illustrated in FIG. 22 and also by a program on a computer having the function of reproducing the recording medium.

In such a manner, according to the embodiment, in addition to the seamless connection of video frames, audio frames can be also seamlessly connected without noise caused by discontinuity at a connection point.

In the foregoing second embodiment of the invention, out of the same portions as those of the first embodiment, in place of the recording/editing apparatus and method and the reproducing apparatus and method (that is, the portion of Example I) shown in FIGS. 4, 5, 6, and 7, the recording/editing apparatus and method and the reproducing apparatus and method shown in FIGS. 16, 17, 18, and 19 (specifically, like Example II, A_overlap at a connection point is calculated upon recording and recorded on a recording medium, A_PTS_offset (and AF_drop) is calculated from A_overlap read from the recording medium upon reproduction and supplied to the audio decode block 55, and it is controlled to perform reproduction while offsetting the timing of reproducing audio frames only by the amount of A_PTS_offset. In the case where AF_drop=1, it is controlled so as not to reproduce the final audio frame in the VOB), or the recording/editing apparatus and method and the reproducing apparatus and method shown in FIGS. 20, 21, 22, and 23 (specifically, like Example III, A_overlap and A_PTS_offset (and AF_drop) at a connection point are calculated upon recording, at least A_PTS_offset (and AF_drop) is recorded on the recording medium, A_PTS_offset (and AF_drop) read from the recording medium is supplied to the audio decode block 75 upon reproduction, and it is controlled to perform reproduction while offsetting the timing of reproducing audio frames only by the amount of A_PTS_offset. In the case where AF_drop=1, it is controlled so as not to reproduce the final audio frame in the VOB) may be employed.

INDUSTRIAL APPLICABILITY

According to the invention, in addition to the process of changing video data for video frame seamless connection, the audio frame edition point is determined so that the period of reproducing the audio frame to be reproduced last in a video object includes time of the video frame connection point, and the period of reproducing the audio frame to be reproduced first in the following video object includes time of the video connection point. In such a manner, an offset process of reducing asynchronization between an audio frame and a video frame after connection point to an amount which cannot be basically detected as a lip-sync deviation is performed. Thus, audio frames can be also seamlessly connected without noise caused by discontinuity at a connection point.

According to the invention, the audio frame edition point is determined and recorded as management information onto a recording medium. On the reproduction side, overlap time between an audio frame to be reproduced last in a video object and an audio frame to be reproduced first in the following video object and audio PTS offset time for offsetting the PTS in the audio frame read from a recording medium are calculated, so that the overlap time and the audio PTS offset time is not calculated on the recording side. Thus, the load on the recording side can be minimized.

According to the invention, at the time of reproducing video data and audio data from a recording medium on which audio data is multiplexed on video data and the resultant is recorded so that the audio buffer occupation amount is equal to or smaller than a value obtained by subtracting the data amount of one audio frame from the upper limit of the specific audio buffer size, even data is reproduced with a delay of one audio frame period at the maximum upon reproduction, occurrence of an overflow in the audio buffer can be prevented.

According to the invention, by offsetting the PTS in the audio frame read from the recording medium in accordance with the audio PTS offset time calculated on the basis of the overlap time read from the recording medium upon reproduction, calculation of overlap time used for calculating the audio PTS offset time for seamless reproduction of audio data upon reproduction is made unnecessary. Thus, the load at the time of seamless reproduction on the reproduction side can be lessened.

Further, according to the invention, by offsetting the PTS in the audio frame read from the recording medium in accordance with the audio PTS offset time read from the recording medium upon reproduction, calculation of the audio PTS offset time for seamless reproduction of audio data on the reproduction side is made unnecessary. Thus, the load at the time of seamless reproduction on the reproduction side can be minimized.

The invention claimed is:

1. An audio/video recording apparatus for, at the time of recording a set of synchronized video data and audio data as a video object onto a recording medium, recording a reproduction sequence for connecting and reproducing a plurality of video objects in part or in whole onto the recording medium so that the reproduction sequence can be designated, comprising:

- audio encoding means that performs encoding including a window function multiplying process and an orthogonal transformation process on an audio signal to be recorded and outputs the audio data;
- video data changing means that changes the video data as necessary so that a video frame to be reproduced last in a video object and a video frame to be reproduced first in the following video object are reproduced seamlessly at a connection point;
- edition point determining means that determines an edition point in the audio frame so that a period of reproducing an audio frame to be reproduced last in the video object includes time of the connection point of the video frames, a period of reproducing an audio frame to be reproduced first in the following video object includes the time of the connection point, and the period of reproducing an audio frame in the video object and the period of reproducing an audio frame in the following video object partly overlap each other around the connection point;
- multiplexing means that multiplexes the audio data and the video data to generate the video object;
- control means that controls the multiplexing means so that an audio buffer occupation amount is equal to or less than a value obtained by subtracting a data amount of one audio frame from the upper limit of a specific audio buffer size, and generates a flag indicative of an audio multiplex state at the time of multiplexing by the multiplexing means; and
- recording means that records the video object output from the multiplexing means controlled by the control means onto the recording medium together with a flag indicative of the audio multiplex state generated by the control means.

2. An audio/video recording apparatus for, at the time of recording a set of synchronized video data and audio data as a video object onto a recording medium, recording a reproduction sequence for connecting and reproducing a plurality of video objects in part or in whole onto the recording medium so that the reproduction sequence can be designated, comprising:

- audio encoding means that performs encoding including a window function multiplying process and an orthogonal transformation process on an audio signal to be recorded and outputs the audio data;
- video data changing means that changes the video data as necessary so that a video frame to be reproduced last in a video object and a video frame to be reproduced first in the following video object are reproduced seamlessly at a connection point;

edition point determining means that determines an edition point in the audio frame so that a period of reproducing an audio frame to be reproduced last in the video object includes time of the connection point of the video frames, a period of reproducing an audio frame to be reproduced first in the following video object includes the time of the connection point, and the period of reproducing an audio frame in the video object and the period of reproducing an audio frame in the following video object partly overlap each other around the connection point;

multiplexing means that multiplexes the audio data and the video data to generate the video object;

control means that controls the multiplexing means so that an audio buffer occupation amount is equal to or less than a value obtained by subtracting a data amount of one audio frame from the upper limit of a specific audio buffer size, and generates a flag indicative of an audio multiplex state at the time of multiplexing by the multiplexing means;

first recording means that records the video object output from the multiplexing means controlled by the control means onto the recording medium together with a flag indicative of the audio multiplex state generated by the control means; and second recording means that records the edition point in the audio frame as registration information onto the recording medium.

3. An audio/video recording method of, at the time of recording a set of synchronized video data and audio data as a video object onto a recording medium, recording a reproduction sequence for connecting and reproducing a plurality of video objects in part or in whole onto the recording medium so that the reproduction sequence can be designated, comprising:

a first step of performing encoding including a window function multiplying process and an orthogonal transformation process on an audio signal to be recorded and outputting the audio data;

a second step of changing the video data as necessary so that a video frame to be reproduced last in a video object and a video frame to be reproduced first in the following video object are reproduced seamlessly at a connection point;

a third step of determining an edition point in the audio frame so that a period of reproducing an audio frame to be reproduced last in the video object includes time of the connection point of the video frames, a period of reproducing an audio frame to be reproduced first in the following video object includes the time of the connection point, and the period of reproducing an audio frame in the video object and the period of reproducing an audio frame in the following video object partly overlap each other around the connection point;

a fourth step of controlling so that an audio buffer occupation amount is equal to or less than a value obtained by subtracting a data amount of one audio frame from the upper limit of a specific audio buffer size at the time of multiplexing the audio data and the video data; and a fifth step of recording a flag indicative of an audio multiplex state under control of the fourth step onto the recording medium together with the video object obtained by multiplexing under the control of the fourth step.

4. An audio/video recording method of, at the time of recording a set of synchronized video data and audio data as a video object onto a recording medium, recording a reproduction sequence for connecting and reproducing a plurality of video objects in part or in whole onto the recording medium so that the reproduction sequence can be designated, comprising:

a first step of performing encoding including a window function multiplying process and an orthogonal transformation process on an audio signal to be recorded and outputting the audio data;

a second step of changing the video data as necessary so that a video frame to be reproduced last in a video object and a video frame to be reproduced first in the following video object are reproduced seamlessly at a connection point;

a third step of determining an edition point in the audio frame so that a period of reproducing an audio frame to be reproduced last in the video object includes time of the connection point of the video frames, a period of reproducing an audio frame to be reproduced first in the following video object includes the time of the connection point, and the period of reproducing an audio frame in the video object and the period of reproducing an audio frame in the following video object partly overlap each other around the connection point;

a fourth step of controlling so that an audio buffer occupation amount is equal to or less than a value obtained by subtracting a data amount of one audio frame from the upper limit of a specific audio buffer size at the time of multiplexing the audio data and the video data;

a fifth step of recording a flag indicative of an audio multiplex state under control in the fourth step onto the recording medium together with the video object obtained by multiplexing under control of the fourth step; and a sixth step of recording the edition point in the audio frame as management information onto the recording medium.

5. An audio/video reproducing apparatus for reproducing video data and audio data on the basis of reproduction management information from a recording medium on which a video object and management information including an edition point in an audio frame and a flag indicative of an audio multiplex state are recorded by a recording apparatus according to claim 2, comprising:

overlap time calculating means that calculates time of overlap between an audio frame to be reproduced last in a video object and an audio frame to be reproduced first in the following video object with respect to an edition point in the reproduction management information;

offset time calculating means that sets the calculated overlap time as audio PTS offset time to be used at the time of reproducing an audio frame of the following video object when the edition point is the first connection point in a designated reproduction sequence, calculates a value obtained by adding the calculated overlap time and audio PTS offset time at the immediately preceding connection point as audio PTS offset time at the present edition point when the edition point is any of the second and subsequent connection points in the reproduction sequence, and outputs an audio drop flag of a predetermined value indicating that it is unnecessary to reproduce an audio frame to be reproduced last in the video object at the time of connection under a predetermined condition;

resetting means that resets a system time clock of the apparatus so as to seamlessly connect video frames to be connected at each of connection points of the video objects included in the reproduction sequence;

offset means that offsets PTS of an audio frame reproduced from the recording medium in accordance with the calculated audio PTS offset time;

video data reproducing means that reproduces video data reproduced from the recording medium in accordance with video PTS accompanying the video data;

audio frame reproducing means that reproduces an audio frame reproduced from the recording medium in accordance with the offset PTS and, when the audio drop flag shows the predetermined value, controls so as not to reproduce an audio frame to be reproduced last in the video object; and audio decoding means that performs decoding including a window function multiplying process and an orthogonal inverse transformation process on the audio frame reproduced by the audio frame reproducing means and outputs an audio signal.

6. The audio/video reproducing apparatus according to claim 5, wherein when the audio PTS offset time at the calculated connection point is longer than a period of "n" times (where n is 1 or ½) of audio frame time, the offset time calculating means calculates a value obtained by subtracting the audio frame period from the audio PTS offset time as final audio PTS offset time, and outputs an audio drop flag of a predetermined value indicating that it is unnecessary to reproduce an audio frame to be reproduced last in the video object at the time of connection.

7. An audio/video reproducing method for reproducing video data and audio data on the basis of reproduction management information from a recording medium on which a video object and management information including an edition point in an audio frame and a flag indicative of an audio multiplex state are recorded by a recording method according to claim 4, comprising:

a first step of calculating time of overlap between an audio frame to be reproduced last in a video object and an audio frame to be reproduced first in the following video object with respect to an edition point in the reproduction management information;

a second step of setting the calculated overlap time as audio PTS offset time to be used at the time of reproducing an audio frame of the following video object when the edition point is the first connection point in a designated reproduction sequence, calculating a value obtained by adding the calculated overlap time and audio PTS offset time at the immediately preceding connection point as audio PTS offset time at the present edition point when the edition point is any of the second and subsequent connection points in the reproduction sequence, and outputting an audio drop flag of a predetermined value indicating that it is unnecessary to reproduce an audio frame to be reproduced last in the video object at the time of connection under a predetermined condition;

a third step of resetting a system time clock of the apparatus so as to seamlessly connect video frames to be connected at each of connection points of the video objects included in the reproduction sequence;

a fourth step of offsetting PTS of an audio frame reproduced from the recording medium in accordance with the audio PTS offset time calculated in the second step;

a fifth step of reproducing video data that is reproduced from the recording medium in accordance with video PTS accompanying the video data;

a sixth step of reproducing an audio frame that is reproduced from the recording medium in accordance with the PTS which is offset in the fourth step and, when the audio drop flag that is output in the third step shows the predetermined value, controlling so as not to reproduce an audio frame to be reproduced last in the video object; and a seventh step of performing decoding including a window function multiplying process and an orthogonal inverse transformation process on the audio frame reproduced in the sixth step and outputting an audio signal.

8. The audio/video reproducing method according to claim 7, wherein in the second step, when the audio PTS offset time at the calculated connection point is longer than a period of "n" times (where n is 1 or ½) of audio frame time, a value obtained by subtracting the audio frame period from the audio PTS offset time is calculated as final audio PTS offset time, and an audio drop flag of a predetermined value indicating that it is unnecessary to reproduce an audio frame to be reproduced last in the video object at the time of connection is output.

9. An audio/video recording apparatus for, at the time of recording a set of synchronized video data and audio data as a video object onto a recording medium, recording a reproduction sequence for connecting and reproducing a plurality of video objects in part or in whole onto the recording medium so that the reproduction sequence can be designated, comprising:

audio encoding means that performs encoding including a window function multiplying process and an orthogonal transformation process on an audio signal to be recorded and outputs the audio data;

video data changing means that changes the video data as necessary so that a video frame to be reproduced last in a video object and a video frame to be reproduced first in the following video object are reproduced seamlessly at a connection point;

edition point determining means that determines an edition point in the audio frame so that a period of reproducing an audio frame to be reproduced last in the video object includes time of the connection point of the video frames, a period of reproducing an audio frame to be reproduced first in the following video object includes the time of the connection point, and the period of reproducing an audio frame in the video object and the period of reproducing an audio frame in the following video object partly overlap each other around the connection point;

multiplexing means that multiplexes the audio data and the video data to generate the video object;

control means that controls the multiplexing means so that an audio buffer occupation amount is equal to or less than a value obtained by subtracting a data amount of one audio frame from the upper limit of a specific audio buffer size, and generates a flag indicative of an audio multiplex state at the time of multiplexing by the multiplexing means;

overlap time calculating means for calculating time of overlap between the audio frame to be reproduced last and the audio frame to be reproduced first so as to include the connection time; and recording means that records the video object output from the multiplexing means controlled by the control means onto the recording medium together with a flag indicative of the audio multiplex state generated by the control means, and records at least the overlap time as management information onto the recording medium.

10. An audio/video recording method of, at the time of recording a set of synchronized video data and audio data as a video object onto a recording medium, recording a reproduction sequence for connecting and reproducing a plurality of video objects in part or in whole onto the recording medium so that the reproduction sequence can be designated, comprising:

a first step of performing encoding including a window function multiplying process and an orthogonal transformation process on an audio signal to be recorded and outputting the audio data;

a second step of changing the video data as necessary so that a video frame to be reproduced last in a video object and a video frame to be reproduced first in the following video object are reproduced seamlessly at a connection point;

a third step of determining an edition point in an audio frame so that a period of reproducing an audio frame to be reproduced last in the video object includes time of the connection point of the video frames and a period of reproducing an audio frame to be reproduced first in the following video object includes the time of the connection point, and the period of reproducing an audio frame in the video object and the period of reproducing an audio frame in the following video object partly overlap each other around the connection point;

a fourth step of controlling so that an audio buffer occupation amount is equal to or less than a value obtained by subtracting a data amount of one audio frame from the upper limit of a specific audio buffer size at the time of multiplexing the audio data and the video data;

a fifth step of calculating time of overlap between the audio frame to be reproduced last and the audio frame to be reproduced first so as to include the connection time; and a sixth step of recording a flag indicative of an audio multiplex state under control of the fourth step onto the recording medium together with the video object obtained by multiplexing under the control of the fourth step, and recording at least the overlap time as management information onto the recording medium.

11. An audio/video reproducing apparatus for reproducing video data and audio data on the basis of a reproduction sequence from a recording medium on which a video object and the reproduction sequence are recorded by a recording apparatus according to claim 9, comprising:

overlap time reproducing means that reproduces the overlap time from the recording medium;

offset time calculating means that sets the overlap time reproduced from the recording medium as audio PTS offset time to be used at the time of reproducing an audio frame of the following video object when the connection point is the first connection point in the reproduction sequence, calculates a value obtained by adding the overlap time reproduced from the recording medium and audio PTS offset time at the immediately preceding connection point as audio PTS offset time at the present edition point when the connection point is any of the second and subsequent connection points in the reproduction sequence, and outputs an audio drop flag of a predetermined value indicating that it is unnecessary to reproduce an audio frame to be reproduced last in the video object at the time of connection under a predetermined condition;

resetting means that resets a system time clock of the apparatus so as to seamlessly connect video frames to be connected at each of connection points of the video objects included in the reproduction sequence;

offset means that offsets PTS of an audio frame reproduced from the recording medium in accordance with the calculated audio PTS offset time;

video data reproducing means that reproduces video data reproduced from the recording medium in accordance with video PTS accompanying the video data;

audio frame reproducing means that reproduces an audio frame reproduced from the recording medium in accordance with the offset PTS and, when the audio drop flag shows the predetermined value, controls so as not to reproduce an audio frame to be reproduced last in the video object; and audio decoding means that performs decoding including a window function multiplying process and an orthogonal inverse transformation process on the audio frame reproduced by the audio frame reproducing means and outputs an audio signal.

12. The audio/video reproducing apparatus according to claim 11, wherein when the audio PTS offset time at the calculated connection point is longer than a period of "n" times (where n is 1 or ½) of audio frame time, the offset time calculating means calculates a value obtained by subtracting the audio frame period from the audio PTS offset time as final audio PTS offset time, and outputs an audio drop flag of a predetermined value indicating that it is unnecessary to reproduce an audio frame to be reproduced last in the video object at the time of connection.

13. An audio/video reproducing method for reproducing video data and audio data on the basis of a reproduction sequence from a recording medium on which a video object and a reproduction sequence are recorded by a recording method according to claim 10, comprising:

a first step of reproducing the overlap time from the recording medium;

a second step of setting the overlap time reproduced from the recording medium as audio PTS offset time to be used at the time of reproducing an audio frame of the following video object when the connection point is the first connection point in the reproduction sequence, calculating a value obtained by adding the overlap time reproduced from the recording medium and audio PTS offset time at the immediately preceding connection point as audio PTS offset time at the present edition point when the connection point is any of the second and subsequent connection points in the reproduction sequence, and outputting an audio drop flag of a predetermined value indicating that it is unnecessary to reproduce an audio frame to be reproduced last in the video object at the time of connection under a predetermined condition;

a third step of resetting a system time clock of the apparatus so as to seamlessly connect video frames to be connected at each of connection points of the video objects included in the reproduction sequence;

a fourth step of offsetting PTS of an audio frame reproduced from the recording medium in accordance with the audio PTS offset time calculated in the second step;

a fifth step of reproducing video data that is reproduced from the recording medium in accordance with video PTS accompanying the video data;

a sixth step of reproducing an audio frame that is reproduced from the recording medium in accordance with the PTS which is offset in the fourth step and, when the audio drop flag that is output in the third step shows the predetermined value, controlling so as not to reproduce an audio frame to be reproduced last in the video object; and a seventh step of performing decoding including a window function multiplying process and an orthogonal inverse transformation process on the audio frame reproduced in the sixth step and outputting an audio signal.

14. The audio/video reproducing method according to claim 13, wherein in the second step, when the audio PTS offset time at the calculated connection point is longer than a period of "n" times (where n is 1 or ½) of audio frame time, a value obtained by subtracting the audio frame period from the audio PTS offset time is calculated as final audio PTS offset time, and an audio drop flag of a predetermined value indicating that it is unnecessary to reproduce an audio frame to be reproduced last in the video object at the time of connection is output.

15. An audio/video recording apparatus for, at the time of recording a set of synchronized video data and audio data as a video object onto a recording medium, recording a reproduction sequence for connecting and reproducing a plurality of video objects in part or in whole onto the recording medium so that the reproduction sequence can be designated, comprising:

audio encoding means that performs encoding including a window function multiplying process and an orthogonal transformation process on an audio signal to be recorded and outputs the audio data;

video data changing means that changes the video data as necessary so that a video frame to be reproduced last in a video object and a video frame to be reproduced first in the following video object are reproduced seamlessly at a connection point;

edition point determining means that determines an edition point in the audio frame so that a period of reproducing an audio frame to be reproduced last in the video object includes time of the connection point of the video frames and a period of reproducing an audio frame to be reproduced first in the following video object includes the time of the connection point, and the period of reproducing an audio frame in the video object and the period of reproducing an audio frame in the following video object partly overlap each other around the connection point;

multiplexing means that multiplexes the audio data and the video data to generate the video object;

control means that controls the multiplexing means so that an audio buffer occupation amount is equal to or less than a value obtained by subtracting a data amount of one audio frame from the upper limit of a specific audio buffer size, and generates a flag indicative of an audio multiplex state at the time of multiplexing by the multiplexing means;

overlap time calculating means for calculating time of overlap between the audio frame to be reproduced last and the audio frame to be reproduced first so as to include the connection time;

offset time calculating means for, when the connection point is the first connection point in the reproduction sequence, setting the overlap time as audio PTS offset time used at the time of reproducing an audio frame in the video object and, when the connection point is any of the second and subsequent connection points in the reproduction sequence, calculating a value obtained by adding the overlap time and audio PTS offset time at the immediately preceding connection point as audio PTS offset time at the present connection point; and recording means that records the video object output from the multiplexing means controlled by the control means onto the recording medium together with a flag indicative of the audio multiplex state generated by the control means, and records at least the overlap time and the audio PTS offset time as management information onto the recording medium.

16. The audio/video recording apparatus according to claim 15, wherein when the audio PTS offset time at the calculated connection point is longer than a period of "n" times (where n is 1 or ½) of an audio frame period, the offset time calculating means calculates a value obtained by subtracting the audio frame period from the audio PTS offset time as final audio PTS offset time and outputs an audio drop flag of a predetermined value indicating that it is unnecessary to reproduce an audio frame to be reproduced last in the video object at the time of connection, and the recording means records the audio PTS offset time and the audio drop flag as the management information onto the recording medium.

17. An audio/video reproducing apparatus for reproducing video data and audio data on the basis of a reproduction sequence from a recording medium on which a video object and the reproduction sequence is recorded by a recording apparatus according to claim 15 or 16, comprising:

resetting means that resets a system time clock of the apparatus so as to seamlessly connect video frames to be connected at each of connection points of the video objects included in the reproduction sequence;

offset means that offsets PTS of an audio frame reproduced from the recording medium in accordance with the audio PTS offset time which is reproduced from the recording medium;

video data reproducing means that reproduces video data reproduced from the recording medium in accordance with video PTS accompanying the video data;

audio data reproducing means that reproduces audio data reproduced from the recording medium in accordance with the offset PTS;

drop processing means that, when the audio drop flag reproduced from the recording medium shows the predetermined value, controls so as not to reproduce an audio frame to be reproduced last in the video object; and audio decoding means that performs decoding including a window function multiplying process and an orthogonal inverse transformation process on the audio data reproduced by the audio data reproducing means and outputs an audio signal.

18. An audio/video recording method for, at the time of recording a set of synchronized video data and audio data as a video object onto a recording medium, recording a reproduction sequence for connecting and reproducing a plurality of video objects in part or in whole onto the recording medium so that the reproduction sequence can be designated, comprising:

a first step of performing encoding including a window function multiplying process and an orthogonal transformation process on an audio signal to be recorded and outputting the audio data;

a second step of changing the video data as necessary so that a video frame to be reproduced last in a video object and a video frame to be reproduced first in the following video object are reproduced seamlessly at a connection point;

a third step of determining an edition point in the audio frame so that a period of reproducing an audio frame to be reproduced last in the video object includes time of the connection point of the video frames and a period of reproducing an audio frame to be reproduced first in the following video object includes the time of the connection point, and the period of reproducing an audio frame in the video object and the period of reproducing an audio frame in the following video object partly overlap each other around the connection point;

a fourth step of controlling so that an audio buffer occupation amount is equal to or less than a value obtained by subtracting a data amount of one audio frame from the upper limit of a specific audio buffer size at the time of multiplexing the audio data and the video data;

a fifth step of calculating time of overlap between the audio frame to be reproduced last and the audio frame to be reproduced first so as to include the connection time;

a sixth step of, when the connection point is the first connection point in the reproduction sequence, setting the overlap time as audio PTS offset time used at the time of reproducing an audio frame in the video object and, when the connection point is any of the second and subsequent connection points in the reproduction sequence, calculating a value obtained by adding the overlap time and audio PTS offset time at the immediately preceding connection point as audio PTS offset time at the present connection point; and a seventh step of recording a flag indicative of an audio multiplex state under control of the fourth step onto the recording medium together with the video object obtained by multiplexing under the control of the fourth step, and recording at least the overlap time and the audio PTS offset time as management information onto the recording medium.

19. An audio/video recording method according to claim 18, wherein in the fifth step, when the audio PTS offset time at the calculated connection point is longer than a period of "n" times (where n is 1 or ½) of an audio frame period, a value obtained by subtracting the audio frame period from the audio PTS offset time is calculated as final audio PTS offset time, and an audio drop flag of a predetermined value indicating that it is unnecessary to reproduce an audio frame to be reproduced last in the video object at the time of connection is output and, in the sixth step, the audio PTS offset time and the audio drop flag are recorded as the management information onto the recording medium.

20. An audio/video reproducing method for reproducing video data and audio data on the basis of a reproduction sequence from a recording medium on which a video object and the reproduction sequence is recorded by a recording method according to claim 18 or 19, comprising:

a first step of resetting a system time clock of the apparatus so as to seamlessly connect video frames to be connected at each of connection points of the video objects included in the reproduction sequence;

a second step of offsetting PTS of an audio frame reproduced from the recording medium in accordance with the audio PTS offset time which is reproduced from the recording medium;

a third step of reproducing video data reproduced from the recording medium in accordance with video PTS accompanying the video data;

a fourth step of reproducing audio data reproduced from the recording medium in accordance with the offset PTS;

a fifth step of, when the audio drop flag reproduced from the recording medium shows the predetermined value, controlling so as not to reproduce an audio frame to be reproduced last in the video object; and a sixth step of performing decoding including a window function multiplying process and an orthogonal inverse transformation process on the audio data reproduced in the fourth step.

* * * * *